United States Patent [19]
Miyakawa et al.

[11] Patent Number: 5,192,848
[45] Date of Patent: Mar. 9, 1993

[54] LASER MACHINING CELL

[75] Inventors: Naoomi Miyakawa, Gifu; Kazuyuki Toda, Aichi; Yukiyasu Nakamura, Inazawa; Minoru Tashiro, Gifu; Yoshihisa Yamaoka, Saki; Isao Kuwayama, Aichi, all of Japan

[73] Assignee: Yamazaki Mazak Kabushiki Kaisha, Japan

[21] Appl. No.: 786,082

[22] Filed: Oct. 31, 1991

[30] Foreign Application Priority Data

| Oct. 31, 1990 [JP] | Japan | 2-294578 |
| Oct. 31, 1990 [JP] | Japan | 2-294579 |
| Oct. 31, 1990 [JP] | Japan | 2-294580 |
| Nov. 9, 1990 [JP] | Japan | 2-305413 |

[51] Int. Cl.$^5$ .................................... B23K 26/02
[52] U.S. Cl. ..................... 219/121.82; 219/121.63; 219/121.67
[58] Field of Search ............ 219/121.63, 121.64, 219/121.72, 121.67, 121.83, 121.13, 121.14, 121.18

[56] References Cited

U.S. PATENT DOCUMENTS 5,064,991  11/1991  Alborante ............ 219/121.63

FOREIGN PATENT DOCUMENTS

| 165871 | 12/1985 | European Pat. Off. |
| 58-93528 | 6/1983 | Japan |
| 60-247422 | 12/1985 | Japan |
| 3-196947 | 8/1991 | Japan |

Primary Examiner—C. L. Albritton
Attorney, Agent, or Firm—Eckert Seamans Cherin & Mellott

[57] ABSTRACT

Various kinds of raw workpieces are stocked in a stocker. A predetermined kind of the workpiece is selected from the stocker with a lifter so as to move to a loading station. The workpiece is held with a vacuum pad of a loader of a workpiece carrying unit. The workpiece carrying unit is moved to a position adajacent to a laser processing machine so as to make the workpiece carrying unit stood by at the position. When machining finishes in the laser processing machine, a supporting unit like a comb of an unloader of the workpiece carrying unit is inserted below the machined workpiece, put on the table of the laser processing machine. The supporting unit is lifted up so as to pick the workpiece up out of the table. The raw workpiece is immediately put on the table with the loader. The workpiece carrying unit is moved to the unloading station. The machined workpiece is put on rollers of the unloading station with the unloader. The rollers are moved so as to drop the machined workpiece on the pallet.

7 Claims, 23 Drawing Sheets

Fig.11
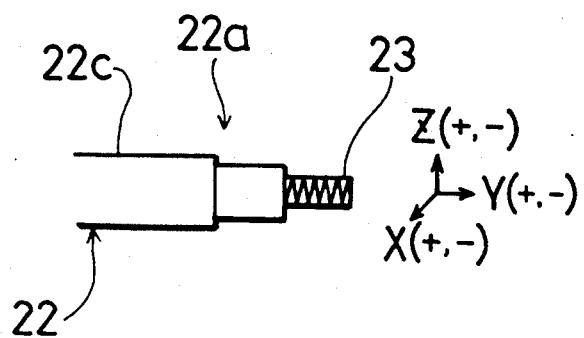
Fig.12
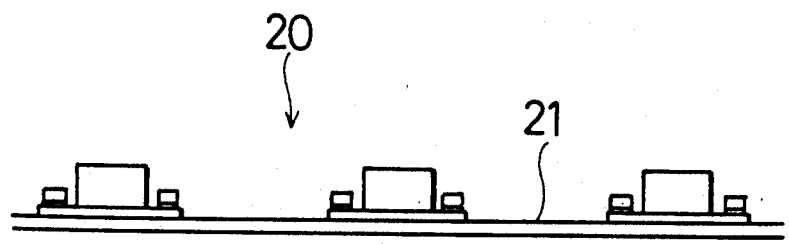
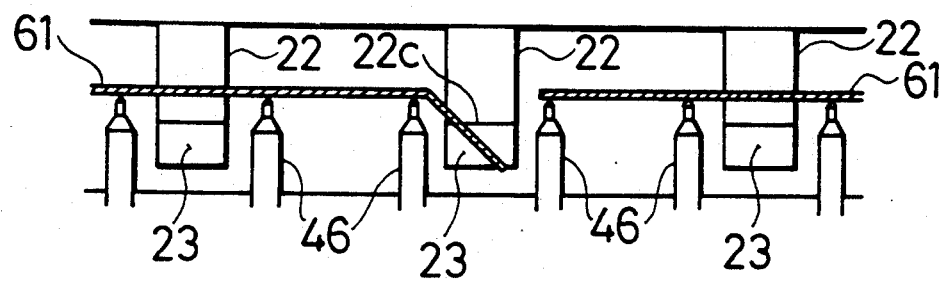

Fig. 22

| LASER PROCESSING MACHINE | MACHINING ORDER 1 | MACHINING ORDER 2 |
|---|---|---|
| NO.1 (43A) | MACHINING PROGRAM NO.1000 KIND:1 | MACHINING PROGRAM NO.1500 KIND:2 |
| NO.2 (43B) | MACHINING PROGRAM NO.2000 KIND:2 | MACHINING PROGRAM NO.2000 KIND:2 |
| NO.3 (43C) | MACHINING PROGRAM NO.3000 KIND:3 | MACHINING PROGRAM NO.3000 KIND:3 |

Fig. 23

| LASER PROCESSING MACHINE | MACHINING ORDER 1 | MACHINING ORDER 2 |
|---|---|---|
| NO.1 (43A) | MACHINING PROGRAM NO.1000  TIME 3:00 | MACHINING PROGRAM NO.1500  TIME 5:00 |
| NO.2 (43B) | MACHINING PROGRAM NO.2000  TIME 5:00 | MACHINING PROGRAM NO.2000  TIME 5:00 |
| NO.3 (43C) | MACHINING PROGRAM NO.3000  TIME 15:00 | MACHINING PROGRAM NO.3000  TIME 15:00 |

LASER MACHINING CELL

BACKGROUND OF THE INVENTION

This invention relates to a laser machining cell being capable of automatically carrying raw workpieces to and machined workpieces from laser processing machines.

Heretofore, carrying raw workpieces to and machined workpieces from a laser processing machine are performed with a carrying unit partially or with manual operation by an operator partially.

Therefore, it is not possible to successively perform laser machining on a lot of workpieces with no man in a conventional method.

SUMMARY OF THE INVENTION

The object of this invention is to successively perform laser machining on a lot of workpieces with no man.

The arrangement of the present invention is that a stock means for stocking a plurality of raw workpieces is provided, one or more than one laser processing machines are provided, a putting means for putting machined workpieces thereon is provided and a carrying unit for carrying the workpieces to the laser processing machine from the stock means or to the putting means from the laser processing machine, is provided.

With the above-mentioned arrangement, carrying raw workpieces to and machined workpieces from the laser processing machine can be successively automatically performed. Therefore, laser machining on a lot of workpieces can be successively performed with no man.

In case where the carrying means is provided with a single travelling means for travelling between the stock means and the laser processing machine and between the laser processing machine and the putting means, and the travelling means is provided with a first holding means for holding the raw workpiece and a second holding means for holding the machined workpiece, separately, carrying the raw workpiece to and the machined workpiece from the laser processing machine can be performed in a short time, as a whole. Besides, the constitution and motion of the carrying means can be comparatively made simple.

In case where the carrying means is provided with a travelling means for travelling between the stock means and the laser processing machine and between the laser processing machine and the putting means, the travelling means is provided with a holding means for holding the workpiece and the holding means is provided with a plurality of comb-like members for supporting the workpiece from the lower side thereof, the workpiece can be properly held and carried whether the workpiece is machined or raw.

Furthermore, in case where a plurality of laser processing machines are provided, the carrying means is provided with a single travelling means for travelling between the stock means and the laser processing machine and between the laser processing machine and the putting means, the travelling means is provided with a first holding means for holding the raw workpiece and a second holding means for holding the machined workpiece, separately, a machining completion discriminating means for discriminating the laser processing machine, in which machining finishes the soonest of all, is provided, and the carrying control means for controlling so as to make the carrying means stand by at the position adjacent to the laser processing machine, discriminated with the machining completion discriminating means in such a state that the raw workpiece is held with the first holding means, is provided, waiting time for carrying the raw workpiece to each of the laser processing machines can be shortened, thereby each laser processing machine can be efficiently operated.

In case where the putting means is provided with a main body, the main body is provided with a workpiece drop hole, bigger than the size of the workpiece, the main body is provided with supporting members for supporting the workpiece, being movable so as to open and close the workpiece drop hole, and a pallet for stacking up the workpieces thereon is provided on the lower hand of the workpiece drop hole of the main body, a plurality of the machined workpieces can be stacked up, properly.

Besides, in case where a stock means for various kinds of workpieces, for stocking a plurality of kinds of raw workpieces, is provided as a stock means and a select means for selecting a predetermined kind of the workpiece from the stock means for various kinds of workpieces, is provided, various kinds of workpieces can be successively and automatically supplied to the laser processing machine. Accordingly, laser machining on the various kinds of workpieces can be successively performed with no man.

BRIEF DESCRIPTION OF THE DRAWINGS

FIG. 11 is a showing a workpiece detecting sensor installed on an unloader of a workpiece carrying unit as shown in FIG. 4;

FIG. 12 is a view showing an example of the use of the workpiece detecting sensor as shown in FIG. 11;

FIG. 22 is a diagramatic representation showing machining schedules of laser processing machines of the laser machining cell as shown in FIG. 18; and FIG. 23 is a diagramatic representation showing computed results of the predicted machining time of each laser processing machine in case where machining is performed on the basis of the machining schedule as shown in FIG. 22.

DESCRIPTION OF THE PREFERRED EMBODIMENTS

Figure 1:
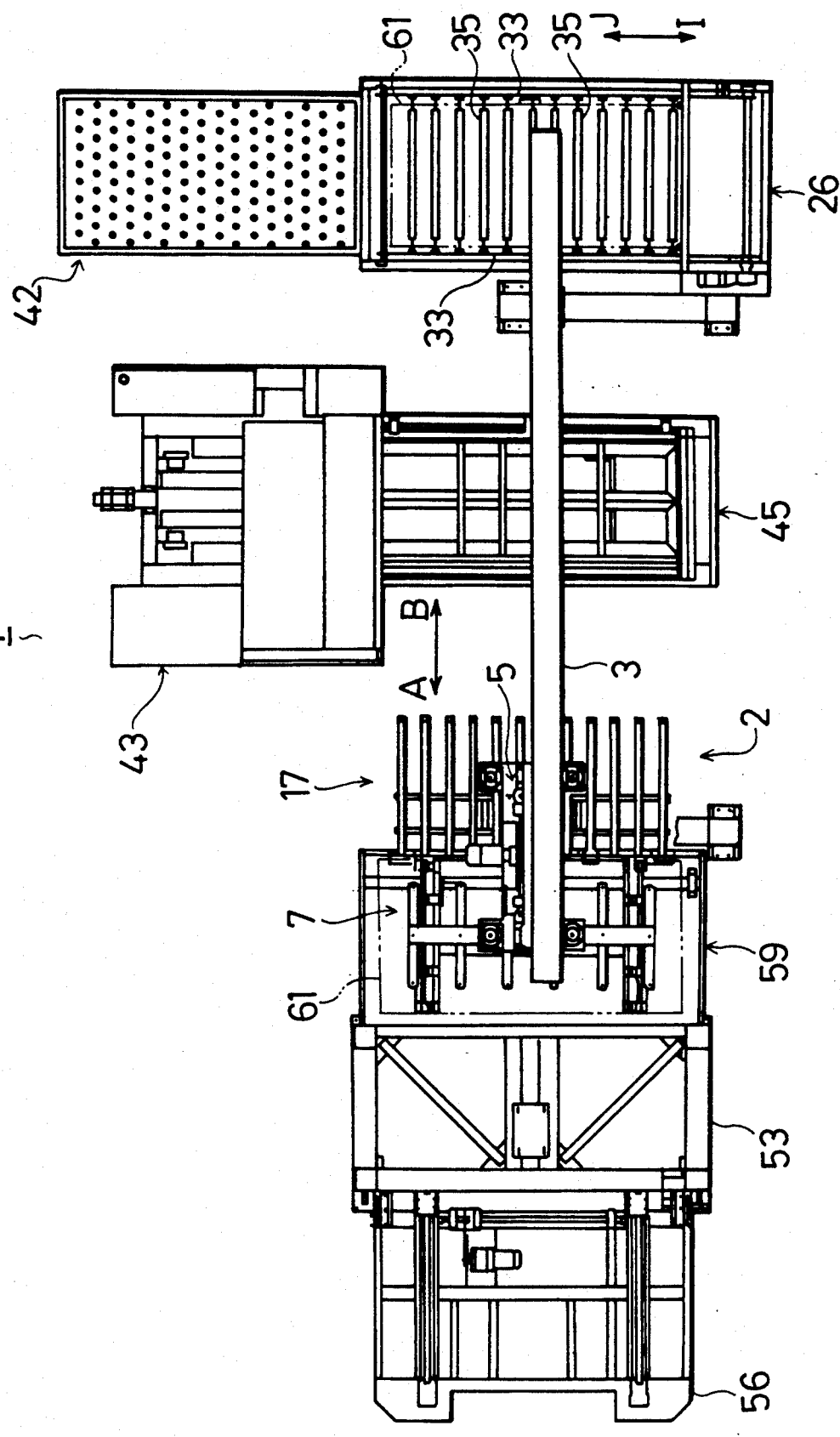
FIG. 1 is a top view of an embodiment of a laser machining cell according to the present invention.
Figure 2:
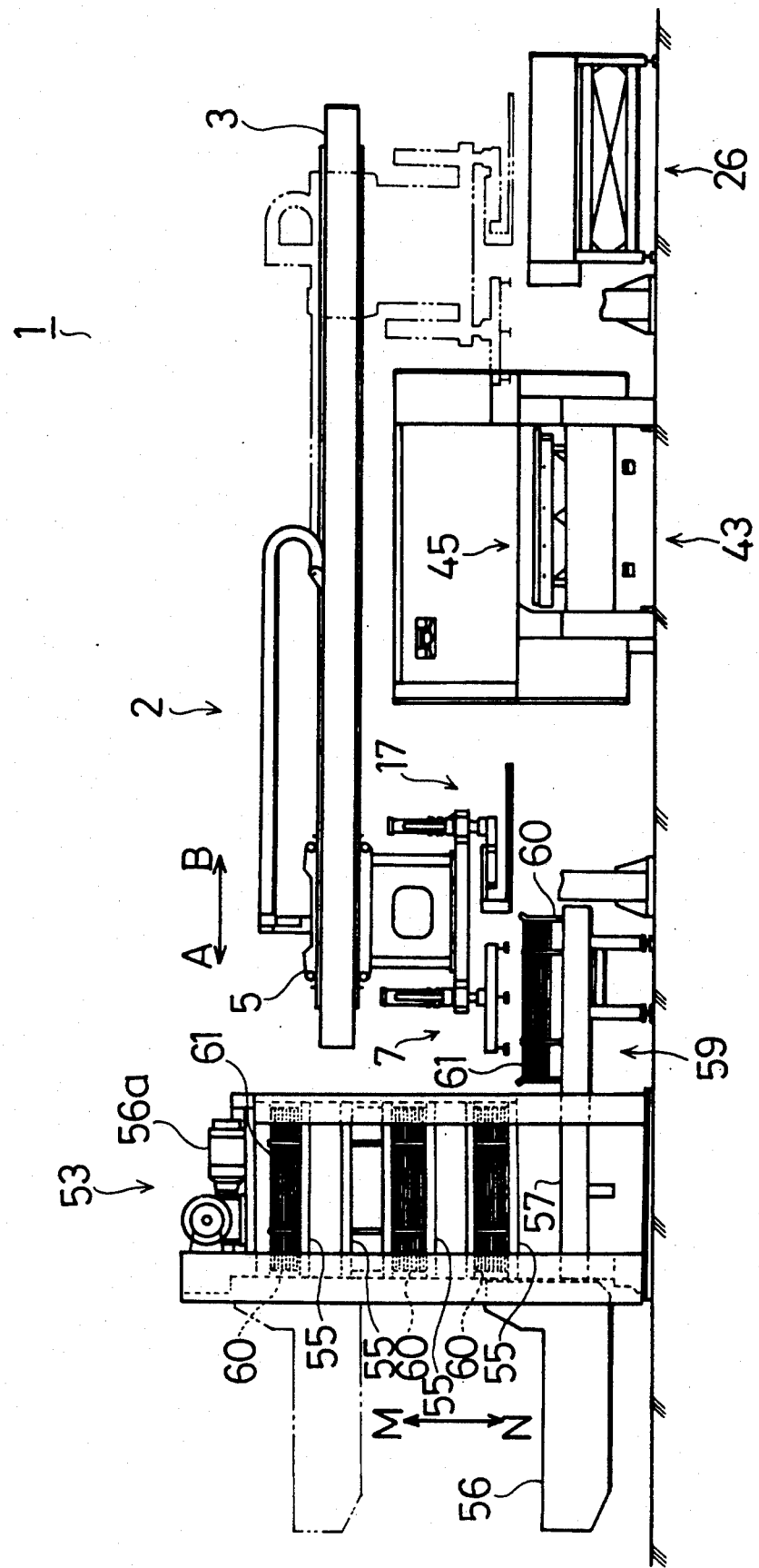
FIG. 2 is a front elevation of the laser machining cell as shown in FIG. 1.

A laser machining cell 1 has a laser processing machine 43, as shown in FIG. 1 or FIG. 2. On the left hand of the laser processing machine 43 in the figure, a material stocker 53 and a loading station 59 are provided. On the right hand of the laser processing machine 43 of the figure, an unloading station 26 and a working station 42 are provided. A workpiece carrying unit 2 is provided communicating with the loading station 59, the laser processing machine 43 and the unloading station 26.

The material stocker 53 has a plurality of shelves 55, lined up in the up and down directions of FIG. 2 (in the directions of the arrows M and N). In each shelf 55, a pallet 60, on which predetermined kinds of a plurality of raw workpieces 61 each like a plate, such as a steel sheet, are stacked, is stored being free to put in and out from the left side of the shelf 55 of the figure.

On the lower hand of the shelves 55 of the material stocker 53 in the figure, a carrying way 57 of the pallet 60 is provided. The pallet 60 can be put in and out of the carrying way 57 from the left side of the carrying way of the figure. With the carrying way 57, the pallet 60 can be moved in the right and left directions of the figure in such a manner that hooks, which is moved with chains, are engaged with the pallet 60. On the right hand of the carrying way 57 of the figure, the loading station 59 is provided.

On the left hand of the shelves 55 of the material stocker 53 and the carrying way 57 of the figure, a lifter 56 is provided being free to lift up and down in the directions of the arrows M and N. With the lifter 56, the pallet 60 can be delivered between the shelves 55 and the lifter 56 or between the lifter 56 and the carrying way 57 in such a manner that hooks, which are moved with chains, are engaged with the pallet 60.

The laser processing machine 43 is provided with a table 45, on which the workpiece 61 to be machined is put.

Figure 6:
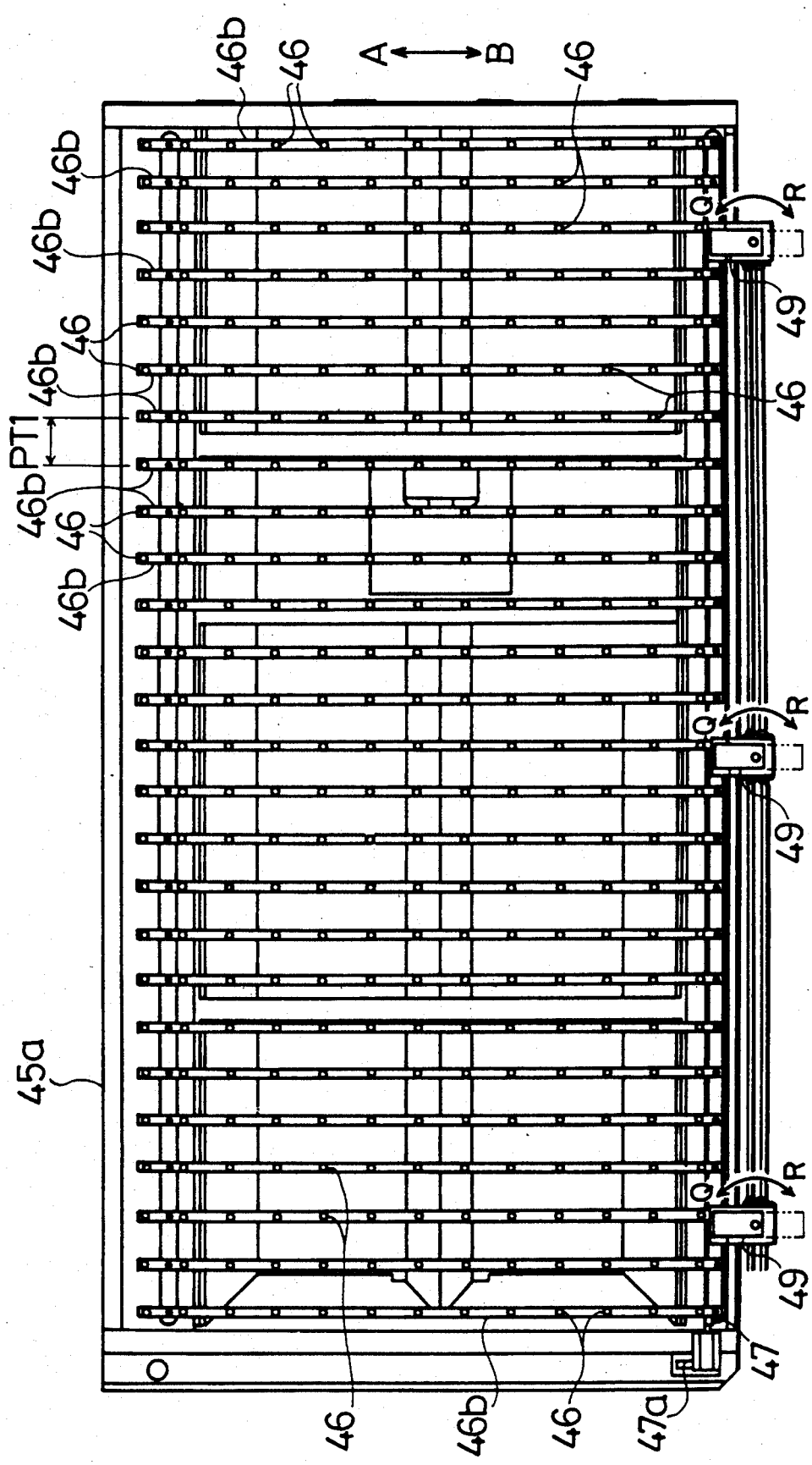
FIG. 6 is a top view of a table of a laser processing machine of the laser cell as shown in FIG. 1.
Figure 9:
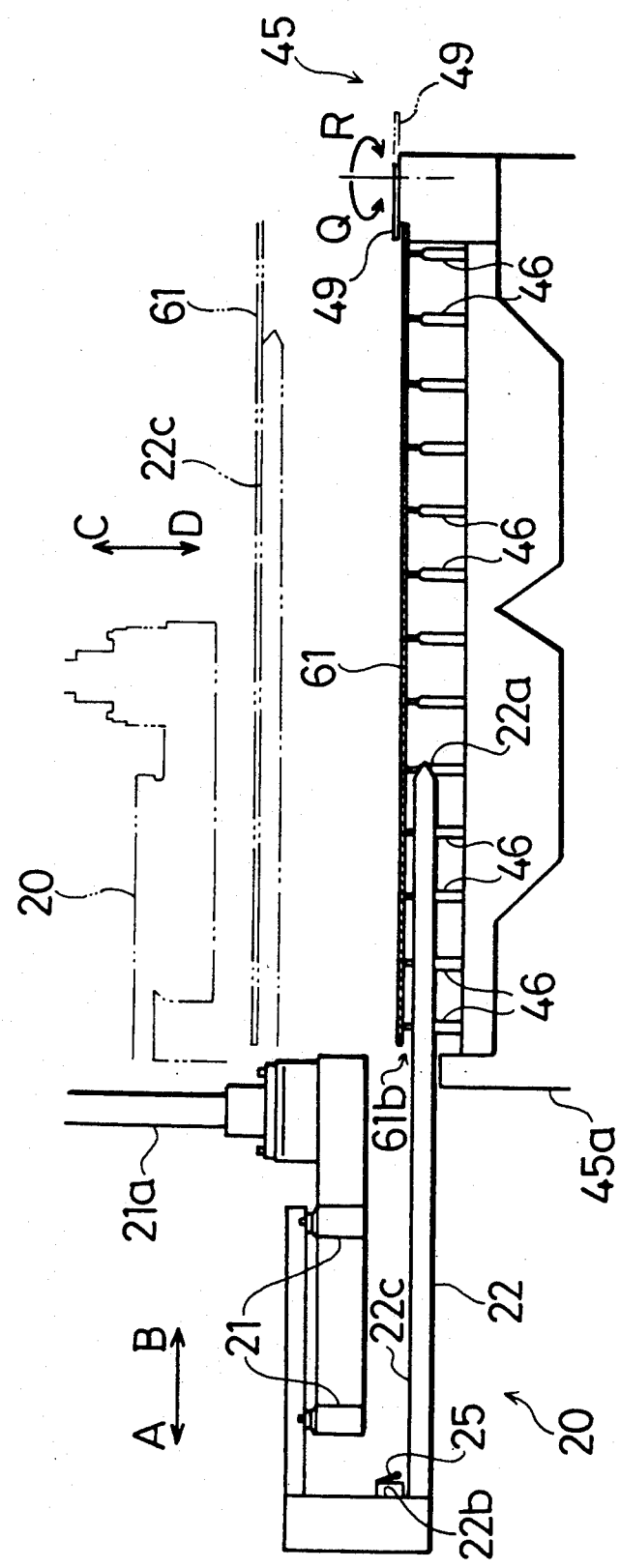
FIGS. 9 and 10 each illustrate way of picking the workpiece up out of the table as shown in FIG. 6.
Figure 10:
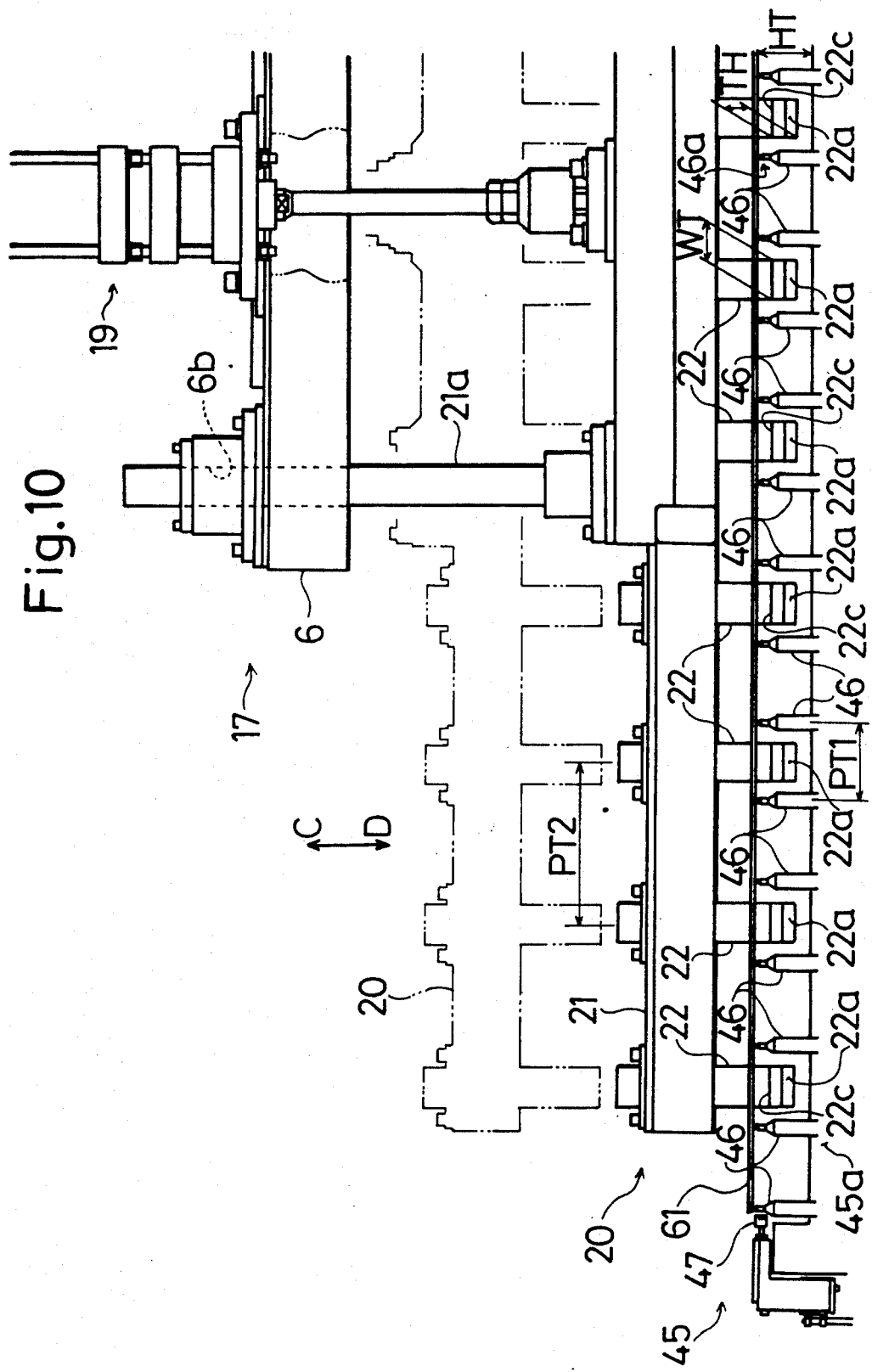

On the table 45 a plurality of bar members 46b are disposed parallel to the horizontal moving directions of a supporting unit 20 of an unloader 17, described hereinafter, (in the directions of the arrows A and B) at predetermined intervals of PT1, as shown in FIG. 6. On each member 46b, a lot of frogs (needle point supporters) 46 are fixed each projecting from the member 46b, as shown in FIG. 6, FIG. 9 or FIG. 10. As shown in FIG. 10, height HT of an end 46a of each frog 46 to a frame 45a is fully big in comparison with thickness TH of an inserting member 22 of the supporting unit 20 of the unloader 17, described hereinafter. The interval between the frogs 46 and 46 is fully big in comparison with width WT of the inserting member 22.

Figure 8:
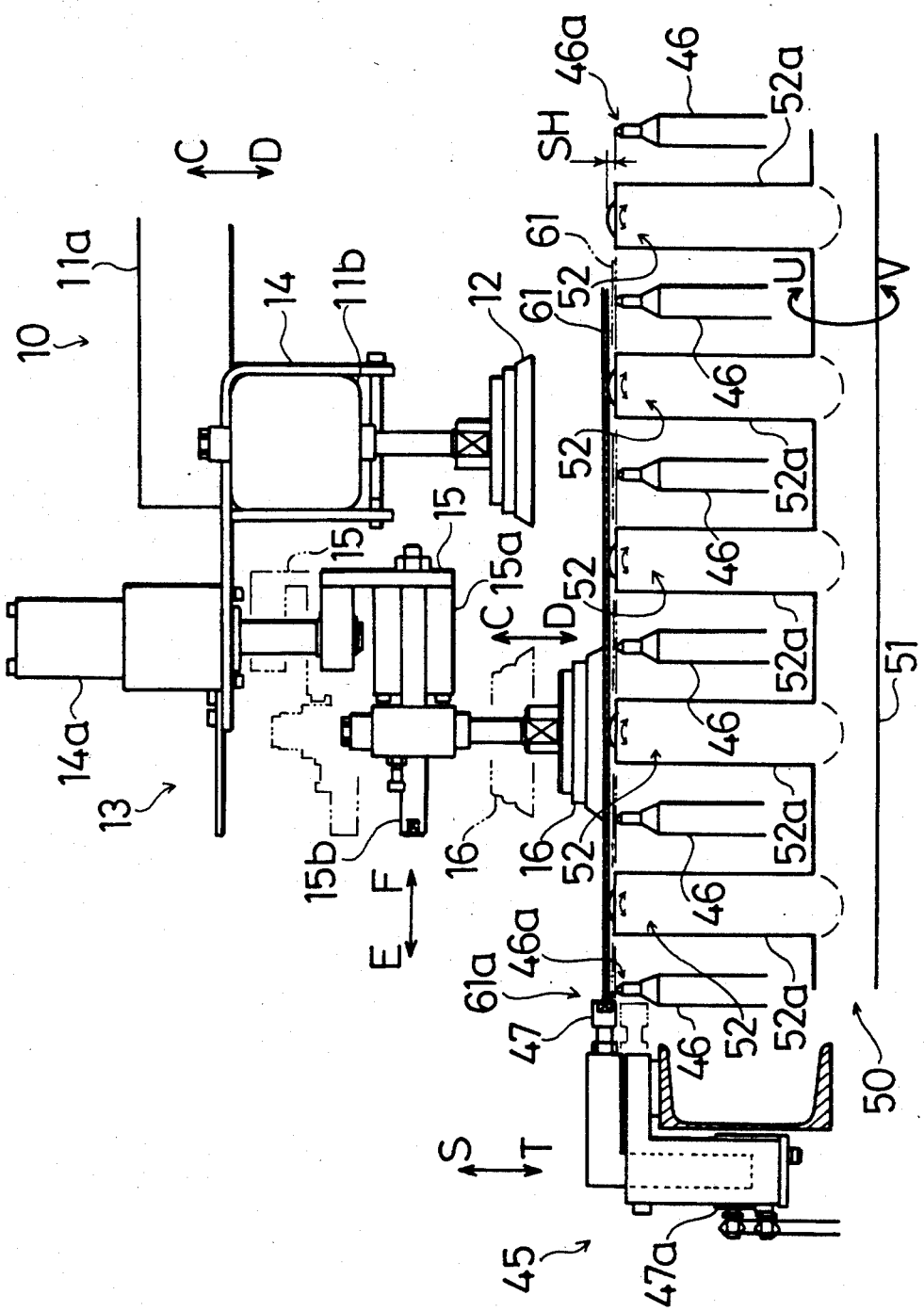

The table 45 is provided with a lifter 50, as shown in FIG. 8. The lifter 50 is provided with a plurality of operation rods 51, being free to move in the directions of the arrows U and V by a known rack-and-pinion mechanism. At the ends of a plurality of arms 52a projecting from each operation rod 51, free bearings (ball casters) 52 are provided. Each free bearing 52 and each arm 52a are disposed between the frogs 46 and 46. With the above-described arrangement, each free bearing 52 can be projected or backed from the ends 46a of the frogs 46 on the upper hand of the figure or on the lower hand of the figure in such a manner that the operation rods 51 are moved in the directions of the arrows U and V.

On the frame on the left side of the table 45 in the figure, a side gauge 47 is provided being free to lift up and down in the directions of the arrows S and T though an air cylinder 47a so as to project and back from the ends 46a of the frogs 46 in the upper and lower directions of the figure. On the frame on the lower side of the table 45 in FIG. 6, a plurality of workpiece clamps 49 are provided movable in the directions of the arrows Q and R between a clamp position as shown with a full line in the figure and a retracting position as shown with two-dot long and two short dashes line in the figure.

Figure 13:
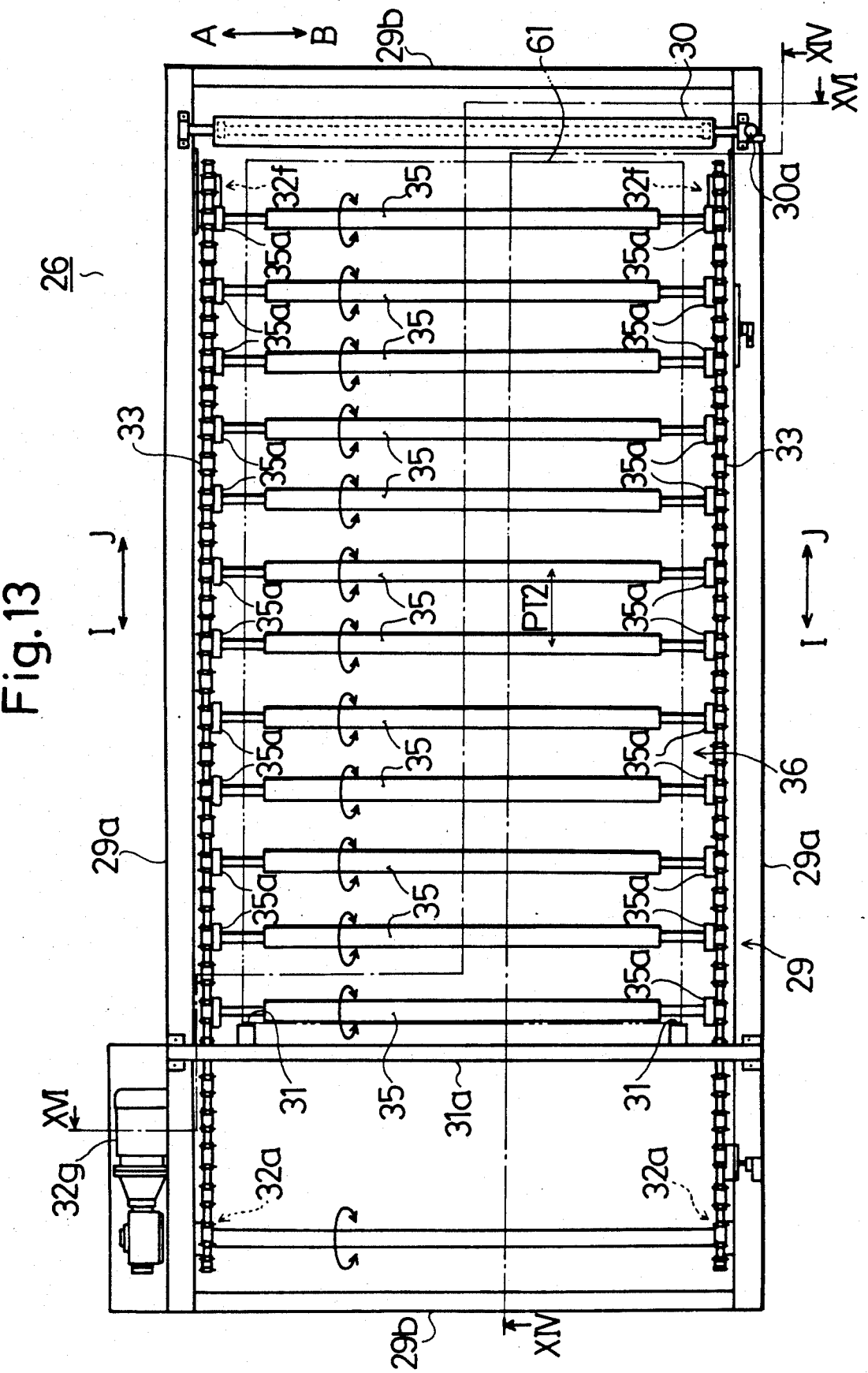
FIG. 13 is top view of an unloading station of the laser machine as shown in FIG. 1.
Figure 14:
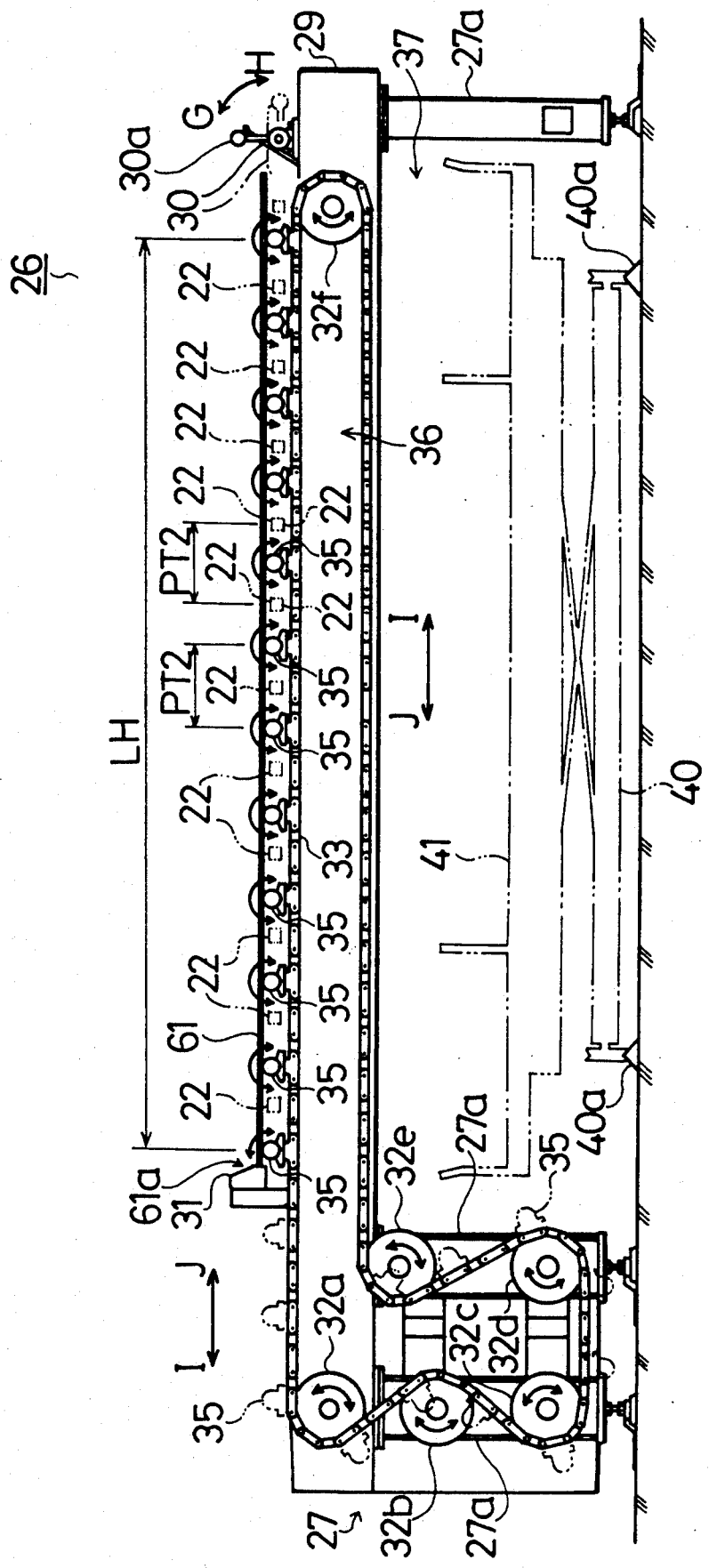
FIG. 14 a sectional view along line XIV—XIV of the unloading station as shown in FIG. 13.

The unloading station 26 has a supporting base 27, as shown in FIG. 14. The supporting base 27 is provided with a frame 29. The frame 29 is supported by a plurality of poles 27a forming a lifter putting space 37 on the lower hand of the figure of the frame 29. The frame 29 is a rectangle, annularly formed with members 29a, 29a, 29b and 29b, forming a workpiece drop hole 36 at the center portion thereof, as shown in FIG. 13.

A guide plate 30, long formed in the up and down directions in the figure (in the directions of the arrows A and B) is provided on the right side of the frame 29 in the figure and between the members 29a and 29a so as to move in the directions of the arrows G and H of FIG. 14 and so as to fix at a predetermined angle with a handle 30a. At the left side portion of the frame 29 of FIG. 13 and between the members 29a and 29a, a stopper 31 is fixedly provided through a supporting member 31a like a bar, long formed in the up and down directions of the figure (in the directions of the arrows A and B). The stopper 31 and the supporting member 31a don't collide with chains 33 and rollers 35, described hereinafter. As shown in FIG. 13, the distance between the guide plate 30 and the stopper 31 is fully big in comparison with the size of the machined workpiece 61, as shown with two-dot long and two short dashes line in the figure.

Inside of the members 29a and 29a, the chains 33, 33, having no end, are movably provided in the directions of the arrows I and J so as to dispose parallel to each other, as shown in FIG. 13. At the left side portion of the frames 29 of FIG. 14, sprocket wheels 32a, with which a driving motor 32g is connected, as shown in FIG. 13, are rotatably provided. At the right side portion of the frames 29 in the figure, sprocket wheels 32f are rotatably provided. On the lower hand of the sprocket wheel 32a of FIG. 14 and on the left hand of the stopper 31 (or the workpiece drop hole 36) of the figure, sprocket wheels 32b, 32c, 32d, and 32e are rotatably respectively provided so as to dispose in a double line on the right and left sides. The chains 33 are installed so as to be a straight line along the frame 29 among the sprocket wheels 32a, 32f and 32e and to be bended among the sprocket wheels 32a, 32b, 32c, 32d and 32e. The length of a portion of the chain 33 extending on the sprocket wheels 32a, 32b, 32c, 32d, and 32e is identical with a length LH of a part of the chain 33, on which the rollers 35, described hereinafter, are installed. As shown in FIG. 13, the distance between the chains 33 and 33 is fully big in comparison with the machined workpiece 61, as shown with two-dot long and two short dashes line in the figure.

Figure 17:
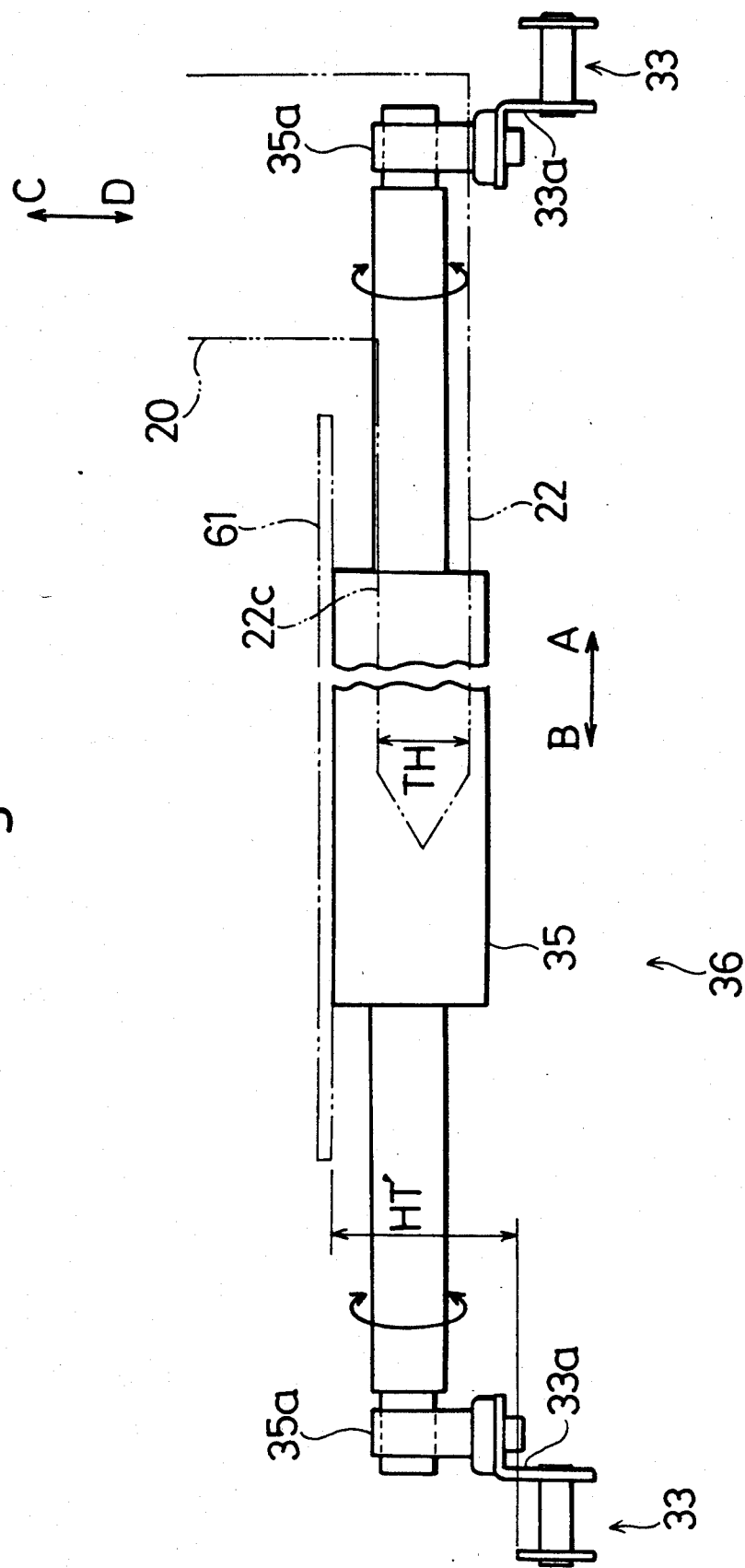
FIG. 17 is an enlarged view of rollers and chains of the unloading station as shown in FIG. 16.

Between the chains 33 and 33, a plurality of rollers 35, (the number thereof is twelve in this embodiment) each like a cylinder, long extending in the up and down directions of FIG. 13, are provided so as to dispose parallel to the direction of level movement of the supporting unit 20 of the unloader 17, described hereinafter, (in the directions of the arrows A and B). As shown in FIG. 17, brackets 35a, 35a are respectively fixed on link plates 33a, 33a of the chains 33, 33. Each roller 35 is rotatably supported by the brackets 35a, 35a at the both ends of right and left in the figure. As shown in FIG. 14, the length LH of a part of the chain 33, installing the rollers 35 thereon, corresponds with the size of the workpiece drop hole 36. A pitch PT2 of each roller 35 is identical with one of the inserting member 22 of the supporting unit 20 of the unloader 17, described hereinafter. The interval between the rollers 35, 35 is fully big in comparison with the width WT of the inserting member 22 of the unloader 17. As shown in FIG. 17, the height HT' to the chain 33 of each roller 35 is fully big in comparison with the thickness TH of the inserting member 22 of the unloader 17.

Figure 16:
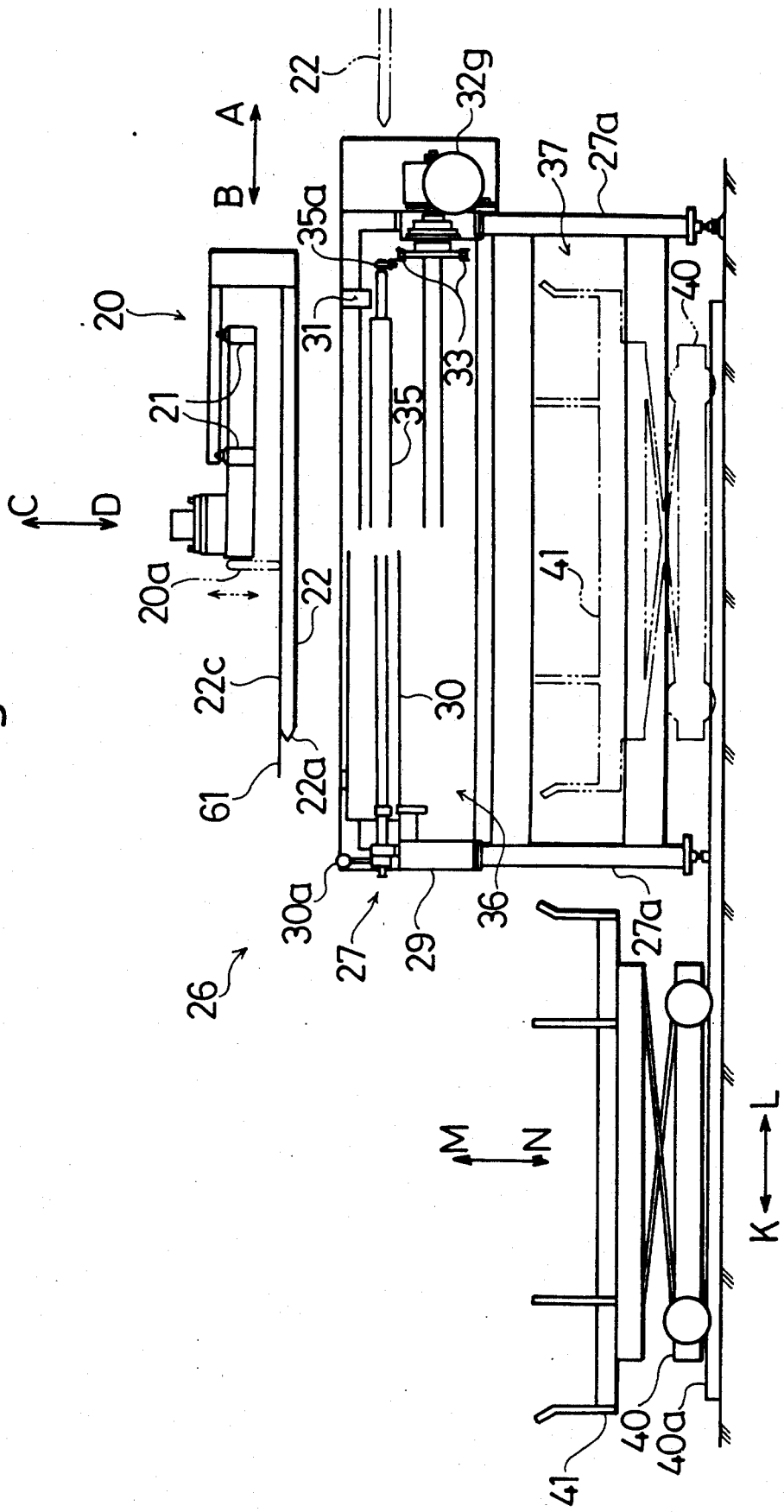
FIG. 16 is a sectional view along line XVI—XVI of the unloading station as shown in FIG. 13.

As shown in FIG. 16, on the lower hand of the workpiece drop hole 36 of the supporting base 27 of the unloading station 26, a rail 40a is provided. On the rail 40a, a lifter 40 is movably provided in the directions of the arrows K and L so as to enter and leave the lifter putting space 37. A pallet 41 is installed on the lifter 40 so as to lift up and down in the directions of the arrows M and N.

Figure 15:
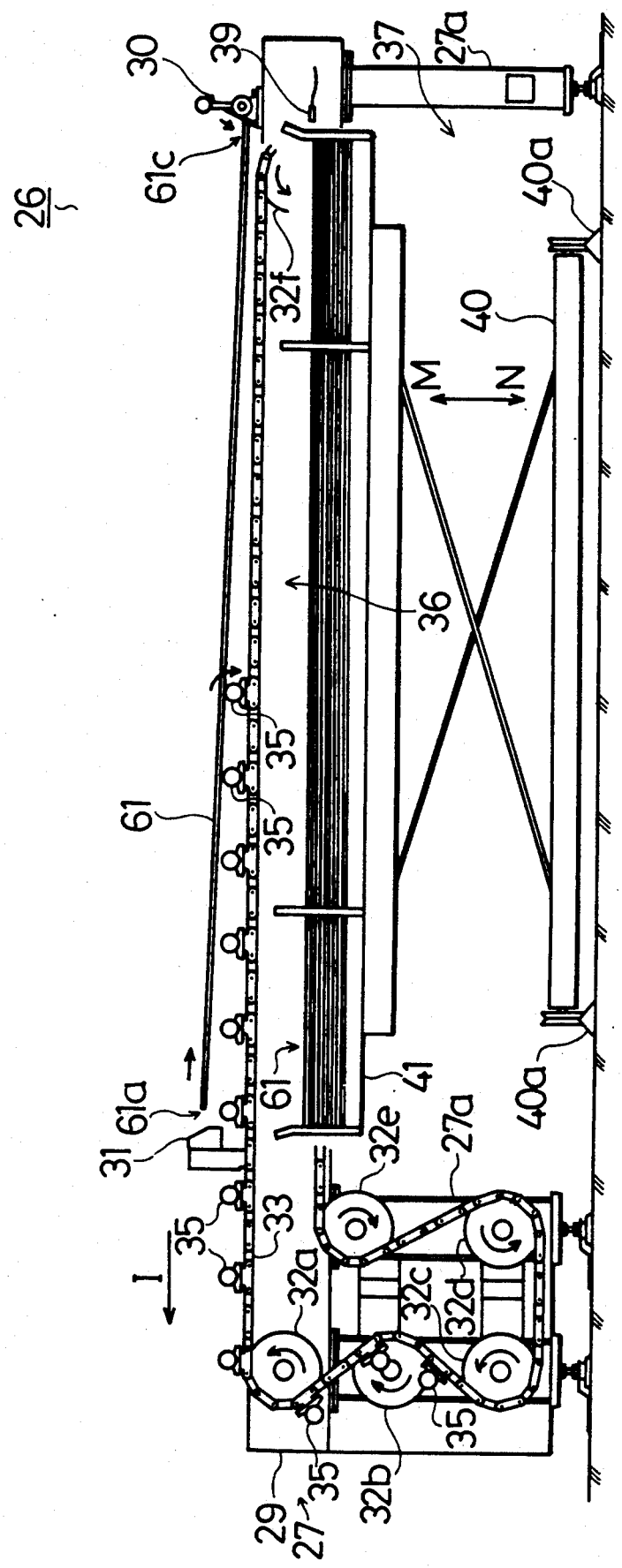
FIG. 15 illustrates way of stacking the workpiece up on a pallet at the unloading station as shown in FIG. 14.

The supporting base 27 is provided with a sensor 39 for detecting the height of a plurality of workpieces 61, stacked up on the pallet 41 of the lifter 40, as shown in FIG. 15.

The working station 42, to be used for dividing operations of the machined workpieces 61 by a worker, is provided on the upper hand of the unloading station 26 of FIG. 1 (on the right hand of the unloading station 26 in FIGS. 13 through 15).

The workpiece carring unit 2 has a rail 3, extending in the right and left directions of FIG. 2. The rail 3 is disposed on the upper hand of the loading station 59, the table 45 of the laser processing machine 43 and the unloading station 26 in the figure.

Figure 3:
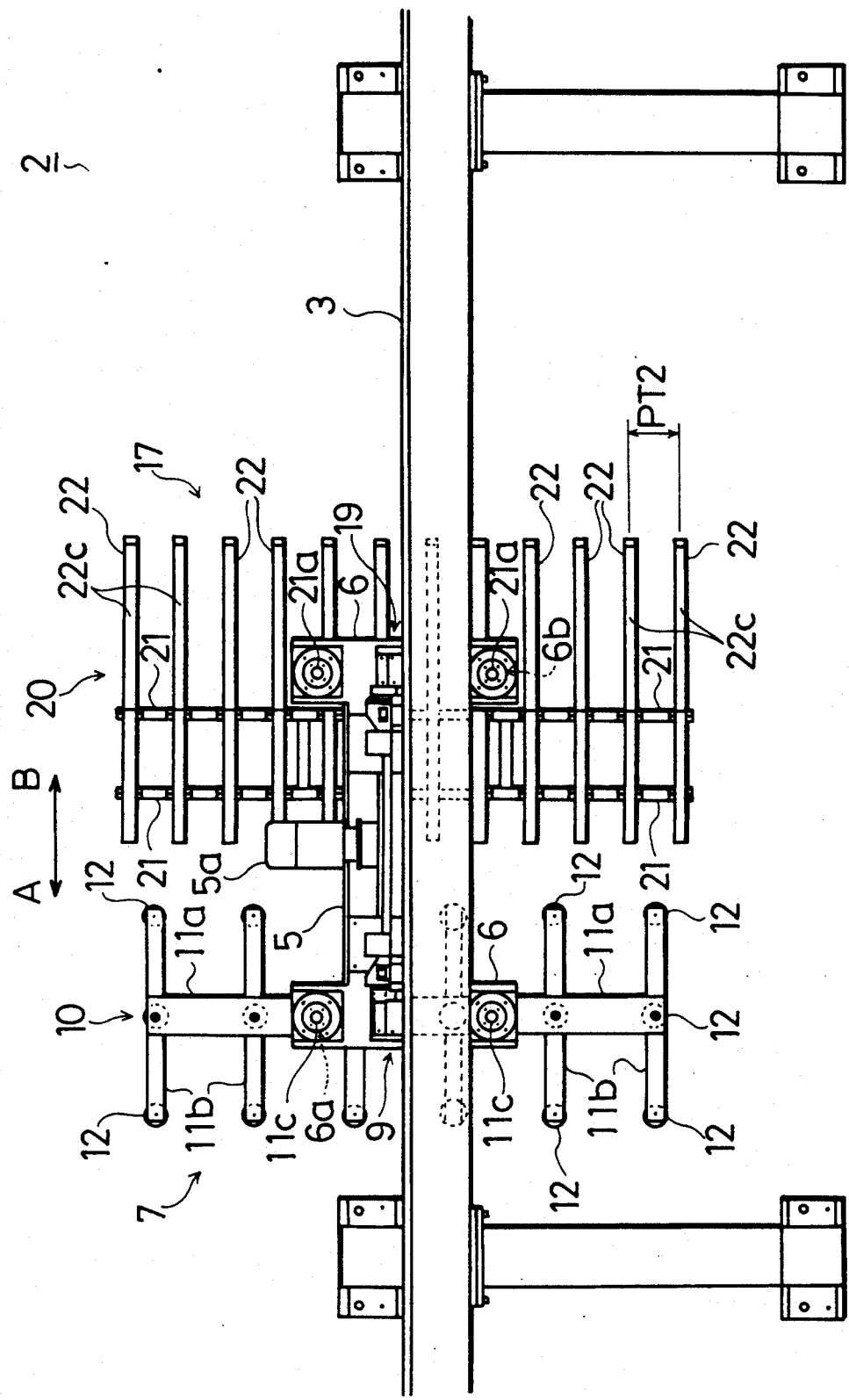
FIG. 3 is a top view of a workpiece carrying unit of the laser machining cell shown in FIG. 1.
Figure 4:
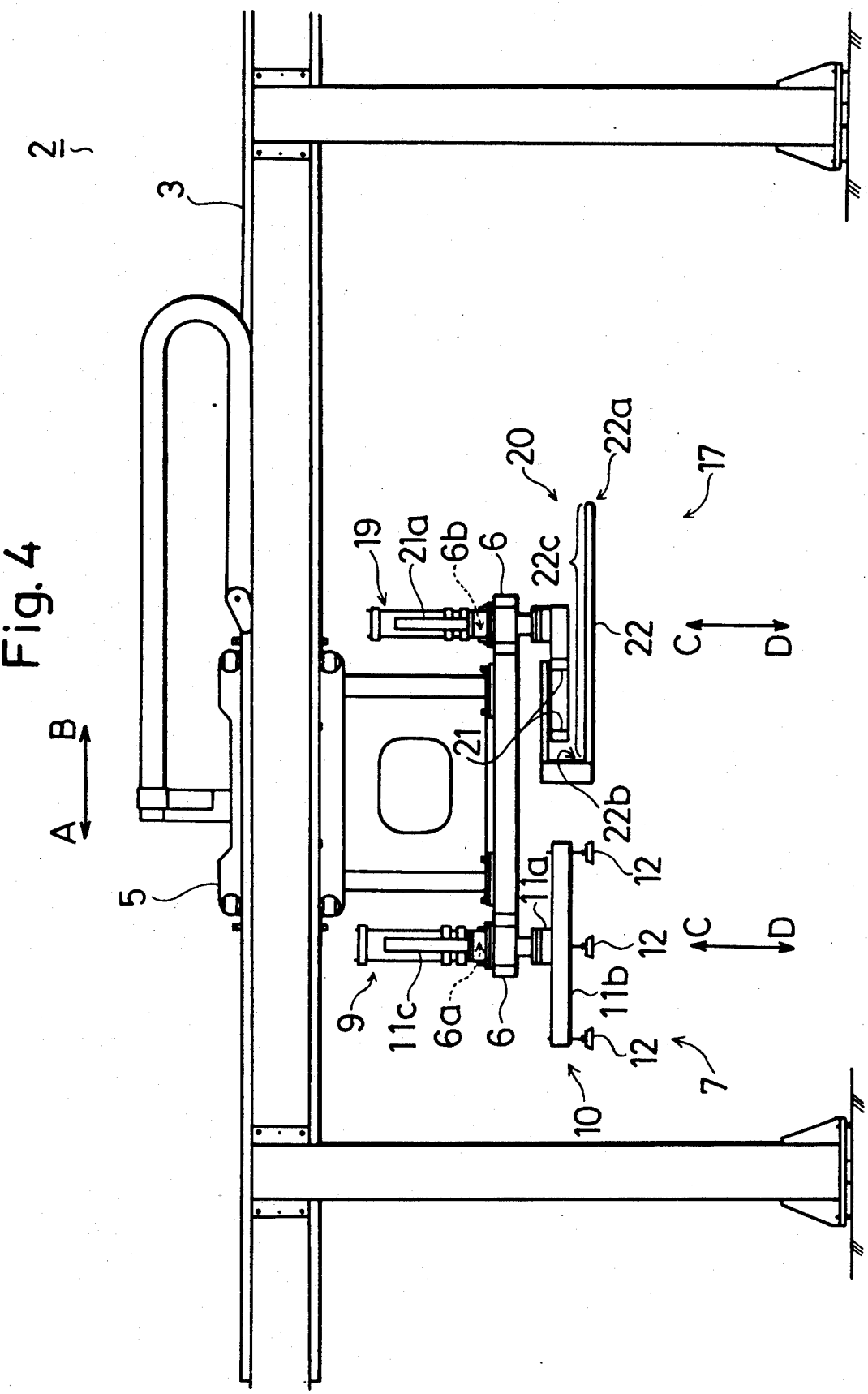
FIG. 4 is a front elevation of the workpiece carrying unit as shown in FIG. 3.
Figure 5:
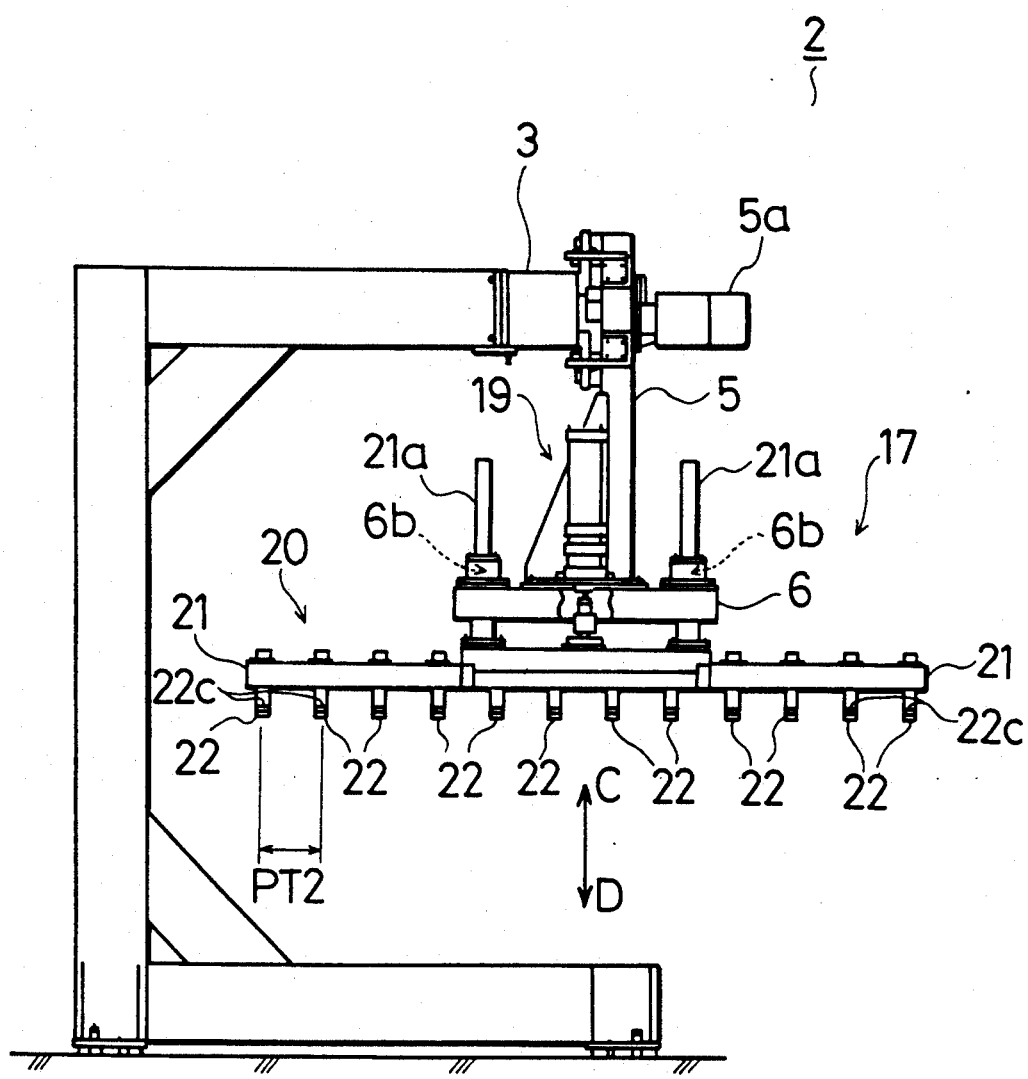
FIG. 5 is a elevation of the workpiece carrying unit as shown in FIG. 3.

On the rail 3, as shown in FIGS. 3 through 5, a travelling unit 5 is provided being movable in the level directions of the arrows A and B through a pinion gear, rotated with a motor 5a, and a rack, fixed on the rail 3. At the lower portion of the travelling unit 5 of FIG. 4, a common frame 6 is fixedly provided. At the left side portion of the common frame 6 of the figure (the loading station 59 side), a loader 7 is provided. At the right side portion of the common frame 6 of the figure (the unloading station 26 side), the unloader 17 is provided.

The loader 7 is provided with an attracting unit 10 so as to lift up and down in the directions of the arrows C and D of FIG. 4. The attracting unit 10 has a frame 11a like a bar, long formed in the up and down directions of FIG. 3. A plurality of frames 11b, each formed like a bar, (the number thereof is six in this embodiment), long in the right and left directions of the figure, are fixed on the frame 11a so as to dispose at predetermined intervals in the up and down directions of FIG. 3. being parallel to each other. Vacuum pads 12 are installed on the both right and left ends and the center portion of each frame 11b of FIG. 4, facing on the lower hand of the figure. The frame 11a is provided with guide rods 11c, 11c, projecting on the upper hand of FIG. 4. The guide rods 11c are slidably inserted in guide holes 6a, provided on the common frame 6, as shown in FIG. 3. On the common frame 6, an air cylinder 9 for lifting the attracting unit 10 up and down in the directions of the arrows C and D of FIG. 4 is fixedly installed.

Figure 7:
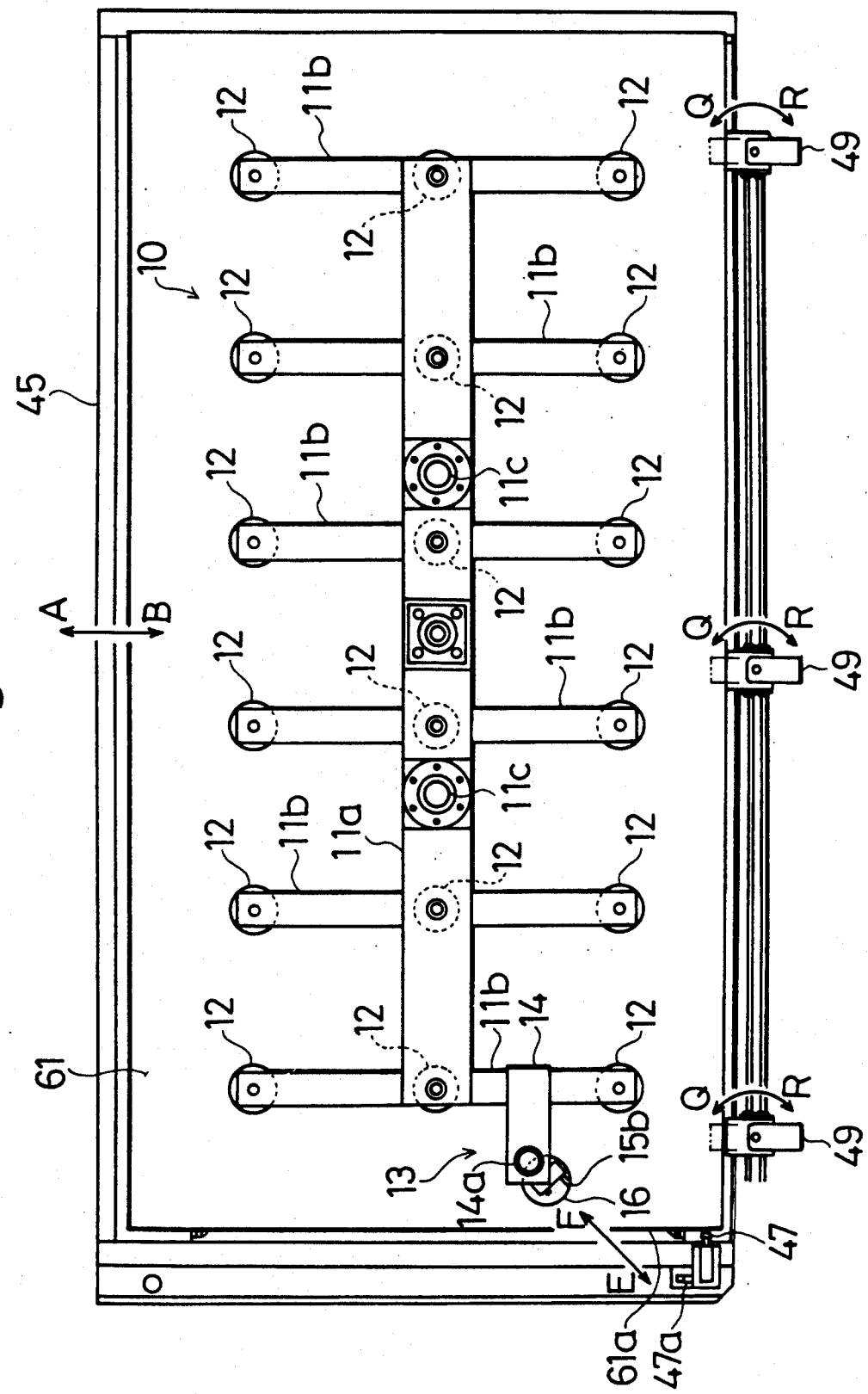
FIGS. 7 and 8 each illustrate way of positioning a workpiece at the table as shown in FIG. 6.

A positioning unit 13 is installed on the attracting unit 10 of the loader 7, as shown in FIG. 7. The positioning unit 13 has a bracket 14, as shown in FIG. 8. The bracket 14 is provided with a member 15 so as to lift up and down through an air cylinder 14a in the directions of the arrows C and D. The member 15 is provided with a vacuum pad 16 being movable in the directions of the arrows E and F through an air cylinder 15a and a guide rod 15b, facing on the lower hand in the figure. On this occasion, the bracket 14 of the positioning unit 13 is fixed on the frame 11b with a bolt or the like and can be easily detached from the frame 11b. Therefore, the position of the frame 11b, at which the positioning unit 13 is installed, can be changed and a plurality of positioning units 13 can be installed on the frame 11b.

The unloader 17 is provided with the supporting unit 20 so as to lift up and down in the directions of the arrows C and D of FIG. 4. The supporting unit 20 has frames 21, long formed in the up and down directions of FIG. 3, like a bar. A plurality of the inserting members 22 (the number thereof is twelve in this embodiment), long formed in the right and left directions of FIG. 4, each like a bar, are fixed on the frames 21 so as to dispose parallel to the level moving directions of the travelling unit 5 and the supporting unit 20 (in the directions of the arrows A and B), as shown in FIG. 3. In other words, a plurality of inserting members 22 of the supporting unit 20 are formed like the teeth of a comb. The pitch PT2 of the inserting member 22 is twice the pitch PT1 of the frog 46 of the table 45 of the laser processing machine 43. Each inserting member 22 is formed like a box, open on the right side of FIG. 4. Between an end 22a and a bent portion 22b, a workpiece putting face 22c is level formed. The portion of the inserting member 22 at which the workpiece putting face 22c is formed (the portion between the end 22a and the bent portion 22b), is formed having a width of WT and a thickness of TH. As shown in FIG. 9, a limit switch 25 is installed on the bent portion 22b of the inserting member 22. The frame 21 is provided with guide rods 21a, 21a, projecting on the upper hand of FIG. 4. The guide rods 21a are slidably inserted in guide holes 6b, provided on the common frame 6, as shown in FIG. 3. On the common frame 6, an air cylinder 19 for lifting the supporting unit 20 up and down in the directions of the arrows C and D of FIG. 4, is fixedly installed.

In order to machine the workpiece 61 like a plate, such as a steel plate, by using the laser processing machine 43 with the above-described arrangement of the laser machining cell 1, the raw workpieces 61 are carried from the loading station 59 to the laser processing machine 43 and the machined workpieces 61 are carried from the laser processing machine 43 to the unloading station 26 with the workpiece carrying unit 2 in the following manner.

At first, the lifter 56 of the material stocker 53 is moved in the directions of the arrows M and N of FIG. 2. The pallet 60 storing a predetermined kinds of raw workpieces 61 is removed from a predetermined shelf 55. Thereafter, the pallet 60 is transferred to the carrying way 57 and the pallet 60 is moved to the right hand in the figure on the carrying way 57 so as to put on the loading station 59.

The travelling unit 5 of the workpiece carrying unit 2 is moved in the direction of the arrow A with the motor 5a so as to position the loader 7 on the upper hand of the loading station 59 of FIG. 2. On this occasion, the vacuum pad 16 of the positioning unit 13 of the loader 7 is lifted up in the direction of the arrow C of FIG. 8 through the air cylinder 14a to the height the same as one of the vacuum pad 12 (or higher than the vacuum pad 12) and is retracted in the direction of the arrow F through the air cylinder 15a. The attracting unit 10 of the loader 7 is lowered in the direction of the arrow D of FIG. 4 through the air cylinder 9. Thereafter, the raw workpiece 61 at the highest position of FIG. 2 of the pallet 60, put on the loading station 59, adheres from the upper side thereof to the vacuum pad 12 by suction (The vacuum pad 16 may be used together with the vacuum pad 12). Thereafter, the attracting unit 10 is lifted up in the direction of the arrow C of FIG. 4 so as to remove a raw workpiece 61 from the pallet 60. The travelling unit 5 is moved in the direction of the arrow B so as to position the removed workpiece 61 on the upper hand of the table 45 of the laser processing machine 43 of FIG. 2.

Each free bearing 52 of the lifter 50 on the table 45 of the laser processing machine 43 is projected a height SH from the ends 46a of the frogs 46 on the upper hand of the figure in such a manner that the operation rod 51 is driven in the directions of the arrows U and V of FIG. 8 while the raw workpiece 61 is carried. Furthermore, the side gauge 47 is lifted up in the direction of the arrow S through the air cylinder 47a so as to project from the ends 46a of the frogs 46 on the upper hand of the figure. Each workpiece clamp 49 of the table 45 is rotated to the retracting position, as shown with a full line of FIG. 7 in the direction of the arrow R of the figure.

The attracting unit 10 of the loader 7 is lowered in the direction of the arrow D of FIG. 8 so as to put the raw workpiece 61, adhering to the vacuum pad 12 by suction, on each free bearing 52 of the lifter 50 of the table 45. Attraction of the raw workpiece 61 to the vacuum pad 12 by suction is released so as to lift the attracting unit 10 up a predetermined distance in the direction of the arrow C. At the same time, the vacuum pad 16 of the positioning unit 13 is lowered together with the member 15 through the air cylinder 14a in the direction of the arrow D so as to project from the vacuum pad 12 on the lower hand of the figure. The raw workpiece 61, put on the free bearing 52, adheres to only the vacuum pad 16 of the positioning unit 13 by suction. The vacuum pad 16, attracting the raw workpiece 61 up, is moved in the direction of the arrow E of FIG. 7 through the air cylinder 15a. Then, the raw workpiece 61, adhering to the vacuum pad 16, is moved in the direction of the arrow E of FIG. 8 on the free bearings 52 while sliding. When an end 61a of the raw workpiece 61 abuts on the side gauge 47, the raw workpiece 61 is positioned with respect to the table 45. On this occasion, the raw workpiece 61 on the free bearings 52 can be smoothly moved because of no connection with the frogs 46.

When it is detected with a positioning sensor (not shown) that the raw workpiece 61 is abutted on the side gauge 47, the movement of the vacuum pad 16 of the positioning unit 13 in the direction of the arrow E is stopped on the basis of a signal from the positioning sensor. At the same time, attraction of the raw workpiece 61 to the vacuum pad 16 by suction is released. The workpiece clamp 49 is rotated to the clamp position, as shown with two-dot long and two short dashes line of FIG. 7 in the direction of the arrow Q of the figure. The free bearings 52 of the lifter 50 are retracted from the ends 46a of the frogs 46 on the lower hand of FIG. 8 in such a manner that operation rods 51 are rotated in the directions of the arrows V and M. The side gauge 47 is lowered in the direction of the arrow T through the air cylinder 47a so as to retract from the ends 46a of the frogs 46, as shown with two-dot long and two short dashes line of the figure, on the lower hand of the figure. The vacuum pad 16 of the positioning unit 13 is lifted up in the direction of the arrow C through the air cylinder 14a, as shown with two-dot long and two short dashes line in the figure. Then, the positioned raw workpiece 61 is supported by each frogs 46, as shown with two-dot long and two short dashes line in the figure.

When the table 45 of the laser processing machine 43 is supplied with the raw workpiece 61, the workpiece 61 is machined after the loader 7 of the workpiece carrying unit 2 is retracted together with the unloader 17 and the travelling unit 5 outside the machining area of the laser processing machine 43.

During the machining on the workpiece 61, the workpiece 61 to be machined next, is removed from the pallet 60, put on the loading station 59 with the loader 7 of the workpiece carrying unit 2, as shown above. The loader 7 holding the workpiece 61 to be machined next, and the unloader 17 holding nothing, are stood by at the positions adjacent to the left hand of the table 45 of the laser processing machine 43 of FIG. 9.

When the machining on the workpiece 61 finishes in the laser processing machine 43, the machined workpiece 61 is removed from the table 45 with the unloader 17.

The unloader 17 of the workpiece carrying unit 2 can be driven, independently of the loader 7. Therefore, the machined workpiece 61 can be removed from the table 45 of the laser processing machine 43 with the unloader 17 while the raw workpiece 61 is held with the loader 7.

Each workpiece clamp 49 of the table 45 is rotated in the direction of the arrow R of FIG. 9 to a retracting position, as shown with two-dot long and two short dashes line of the figure.

The supporting unit 20 of the unloader 17 of the workpiece carrying unit 2 is lowered in the direction of the arrow D through the air cylinder 19 at the position on the left hand of the table 45 of FIG. 9 so as to position the putting faces 22c of the inserting members 22 at a slightly lower position than the height of the workpiece 61, put on the table 45. Thereafter, the travelling unit 5 and the supporting unit 20 are level moved in the direction of the arrow B through a motor 5a. Then, each of the inserting members 22 of the holding unit 20, provided parallel to each other in the directions of the arrows A and B, is inserted between the frogs 46 and 46 on the lower hand of the figure of the machined workpiece 61, as shown in FIG. 9 or FIG. 10. On this occasion, the lifter 50 and the inserting members 22 don't collide with each other as each free bearing 52 of the lifter 50 of the table 45 is in the state of receding on the lower hand of the figure. The machined workpiece 61 on the frogs 46 is moved relatively to the inserting members 22 to the bent portion 22b side from the end 22a side. When an end 61b of the machined workpiece 61 abuts on the limit switch 25, installed on the bent portion 22b, the movement of the travelling unit 5 with the motor 5a in the direction of the arrow B is stopped. Then, the putting face 22c of the supporting unit 20 becomes in the state of completely being inserted on the lower hand of the machined workpiece 61 in the figure. Thereafter, the supporting unit 20 is lifted up in the direction of the arrow C through the air cylinder 19, as shown with two-dot long and two short dashes line of the figure. Then, the machined workpiece 61 is held with the inserting members 22 from the lower side thereof and is away from the frogs 46 so as to remove from the table 45 on the upper hand in the figure.

The supporting unit 20 may be provided with a pressing member 20a so as to be free to project and recede with respect to the putting face 22c with an air cylinder or the like, as shown with two-dot long and two short dashes line in FIG. 16. Then, the workpiece 61, held on the lower side thereof with the inserting members 22 can be pressed on the upper side thereof with the pressing member 20a so as not to drop.

A sensor 23 for detecting the workpiece 61 may be installed on the end 22a of each inserting member 22 of the supporting unit 20, as shown in FIG. 11. The sensor 23 outputs a signal to a control unit when the workpiece 61 is detected in one direction of six directions (the negative and positive directions of X-axis, Y-axis and Z-axis, perpendicular to each other). In case where the inserting members 22 of the holding unit 20 are inserted on the lower hand of FIG. 12 of the machined workpiece 61, therefore, the supporting unit 20 is stopped when the machined workpiece 61 abuts on the sensors 23 of the ends 22a of the inserting members 22, thereby an operator can be warned. There is a case where a part of the machined workpiece 61 becomes in a state of suspending between the frogs 46 and 46, as shown in FIG. 12, at the time of laser machining on the workpiece 61. In such a case, when the inserting members 22 are inserted between the frogs 46 and 46, the machined workpiece 61 is hurted. When the sensors 23 are installed on the inserting members 22, the hurt to the machined workpiece can be prevented.

The machined workpiece 61 may be attracted on the upper side thereof with magnets in order to carry the machined workpiece 61 from the laser processing machine 43. However, when the workpiece 61 is held on the lower side thereof with the supporting unit 20, as described hereinbefore, the mechanism of the unloader 17 can be comparatively made simple. In case where the supporting unit 20 is used, aluminum plates, plastic plates and extremely thin steel plates, which can't be handled with magnets, can be used or handled as the workpieces 61. In case of the use of the supporting unit 20, the workpiece 61 can be certainly held in comparison with the case of the use of magnets and a heavy workpiece can be held.

When the machined workpiece 61 is removed from the table 45 of the laser processing machine 43, the travelling unit 5 of the workpiece carrying unit 2 is moved a predetermined distance in the direction of the arrow B in FIG. 2 while the machined workpiece 61 is held with the unloader 17. The attracting unit 10 of the loader 7 is lowered in the direction of the arrow D through the air cylinder 9 so as to put the raw workpiece 61 on the table 45. The vacuum pad 16 of the positioning unit 13 is driven through the air cylinders 14a, 15a so as to position the raw workpiece 61 with respect to the table 45.

A single workpiece holding means may be used as a loader and an unloader in carrying the machined workpiece 61 from the laser processing machine 43 and carrying the raw workpiece 61 to the laser processing machine 43. In case where the loader 7 and the unloader 17 can be separately driven, as described hereinbefore, however, the table 45 of the laser processing machine 43 can be supplied with the raw workpiece 61 with the loader 7 while the machined workpiece 61 is held with the unloader 17. Therefore, removing the machined workpiece 61 from the laser processing machine 43 and supplying the laser processing machine 43 with the raw workpiece 61 can be successively performed by transferring the raw workpiece 61 to a position adjacent to the laser processing machine 43 during machining with the laser processing machine 43. Therefore, the idle time of the laser processing machine 43 (the time waiting for the supply of the raw workpiece 61) can be shortened.

The supporting unit 20 and the attracting unit 10 are installed on the single travelling unit 5 through the common frame 6. Therefore, carrying the raw workpiece 61 from the loading station 59 to the laser processing machine 43 and carrying the machined workpiece 61 from the laser processing machine 43 to the unloading station 26 can be performed with the single travelling unit 5. Accordingly, the mechanism and operations of the workpiece carrying unit 2 can be made simple in comparison with ones in case where the travelling means of the loader and the travelling means of the unloader are separately provided.

When supplying the laser processing machine 43 with the raw workpiece 61 finishes, the travelling unit 5 of the workpiece carrying unit 2 is moved in the direction of the arrow B so as to position the machined workpiece 61, held with the unloader 17, on the upper hand of the workpiece drop hole 36 of the unloading station 26 of FIG. 16.

While the machined workpiece 61 is carried, the chains 33, 33 of the unloading station 26 are moved in the direction of the arrow J of FIG. 14 with the motor 32g so as to move each roller 35 on the chains 33, 33 to the position as shown with a full line in the figure from the position as shown with two-dot long and two short dashes line in the figure. Then, the workpiece drop hole 36 of the supporting base 27 becomes in a state of being covered with each roller 35, as shown in FIG. 13. On this occasion, positioning of the rollers 35 by movement of the chains 33 is performed through a dog (not shown) fixed on the chain 33 and a limit switch (not shown) fixed on the supporting base 27. The guide plate 30 is rotated in the direction of the arrow G of FIG. 14 through the handle 30a so as to fix inclining to the workpiece drop hole 36, as shown with the full line of the figure. The lifter 40 is moved in the direction of the arrow L of FIG. 16 so as to put in the lifter putting space 37 of the workpiece drop hole 36 on the lower hand of the figure, as shown with two-dot long and two short dashes line of the figure. The pallet 41 is lifted up to the predetermined height in the direction of the arrow M.

Thereafter, the supporting unit 20 of the unloader 17 is lowered in the direction of the arrow D of FIG. 17 through the air cylinder 19 so as to position the putting faces 22c of the inserting members 22 at a position slightly lower than the height of the rollers 35. Then, each inserting members 22 of the supporting unit 20 is inserted between the rollers 35 and 35, as shown in FIG. 14. The machined workpiece 61, which has been held with the inserting members 22, is put on each roller 35 and leaves the inserting members 22. Thereafter, the travelling unit 5 and the supporting unit 20 are level moved in the direction of the arrow A with the motor 5a. Then, each inserting member 22 of the unloader 17 is pulled out between the rollers 35 and 35 on the lower hand of the figure of the machined workpiece 61.

When the machined workpiece 61 is put on the rollers 35 of the unloading station 26 in this way, the unloader 17 of the workpiece carrying unit 2 is retracted together with the loader 7 and the travelling unit 5 from the unloading station 26.

The chains 33, 33 of the unloading station 26 are moved in the direction of the arrow I of FIG. 14 with the motor 32g so as to move each roller 35 from the position, as shown with the full line in the figure, to the position, as shown with two-dot long and two short dashes line in the figure. Then, all of the rollers 35, which have covered the workpiece drop hole 36 of the supporting base 27, is retracted on the left hand in the figure from the workpiece drop hole 36 so as to open the workpiece drop hole 36. On this occasion, the part of the chain 33 installing the rollers 35 thereon becomes in a state of bending among the sprocket wheels 32a, 32b, 32c, 32d and 32e. Therefore, as the space for retracting of the rollers 35 can be made smaller, the unloading station 26 can be made compact.

When the rollers 35 are moved in the direction of the arrow I, the end 61a of the machined workpiece 61 on the rollers 35 abuts on the stopper 31 and the movement of the machined workpiece 61 in the direction of the arrow I is restricted. Then, each roller 35 is retracted away from on the workpiece drop hole 36 rolling under the machined workpiece 61 and the machined workpiece 61 remains on the workpiece drop hole 36. Therefore, the right side portion of FIG. 15 of the machined workpiece 61 is no longer supported by the rollers 35, thereby the machined workpiece 61 is inclined on the right lower hand of the figure on the rollers 35 so as to move. An end 61c of the machined workpiece 61 is then abutted on the guide plate 30 and is slidably moved on the lower hand of the figure on the guide plate 30. When all of the rollers 35 is retracted from the workpiece drop hole 36 on the left hand in the figure, the machined workpiece 61 drops through the workpiece drop hole 36 while being guided by the guide plate 30. The machined workpiece 61 is stacked up on the pallet 41, put in the lifter putting space 37 on the lower hand in the figure of the frame 29.

The height of the machined workpiece 61, already stacked on the pallet 41, is detected by the sensor 39 and is kept constant by lifting the pallet 41 up and down in the directions of the arrows M and N. Therefore, dropping of the machined workpiece 61 from the rollers 35 to the pallet 41 is properly performed as the drop height is always constant in addition to the fact that the machined workpiece 61 is guided by the guide plate 30. When the machined workpieces 61 are fully put on the pallet 41, the lifter 40 and the pallet 41 are moved in the direction of the arrow K of FIG. 16 so as to remove from the lifter putting space 37. The new empty pallet 41 is then moved in the direction of the arrow L so as to put in the lifter putting space 37.

Accordingly, removing the raw workpiece 61 from the material stocker 53, supplying the laser processing machine 43 with the raw workpiece 61, carrying the machined workpiece 61 from the laser processing machine 43 and putting the machined workpiece 61 on the pallet 41 can be automatically performed, thereby the laser machining cell 1 can be successively operated for a long time without assistance by a man.

In the unloading station 26, it is possible to carry the machined workpiece 61 to the working station 42, as shown in FIG. 1, as well as to stack up on the pallet 41, as shown the above. In this case, the guide plate 30 is rotated in the direction of the arrow H of FIG. 14 so as to fix at the height almost the same as the rollers 35, as shown with twodot long and two short dashes line in the figure, having level angle. The rollers 35 are fixed at the position covering the workpiece drop hole 36, as shown with full line of the figure, without driving the chains 33. When the machined workpiece 61 is put on the rollers 35 with the unloader 17, as shown hereinbefore, the machined workpiece 61 is slidably moved on the right hand of the figure on the rollers 35 with manual operation. The machined workpiece 61 is passed on the guide plate 30, horizontally fixed, so as to carry to the working station 42 (not shown in FIG. 14). In the working station 42, the machined workpiece 61 is divided into manufactured articles and scraps by a worker.

In the unloading station 26, the machined workpiece 61, carried from the laser processing machine 43, is once put on the rollers 35. The machined workpiece 61 on the rollers 35, can be put on the pallet 41 or carried to the working station 42 by changing the angle of the guide plate 30.

Therefore, the machined workpiece 61 can be divided by a worker just after carrying from the laser processing machine 43. As described hereinbefore, it is also possible that the machined workpiece 61 is once kept at a predetermined space putting on the pallet 41, and divided by a worker afterwards.

In the above-described embodiment, it was mentioned that the machined workpiece 61 was put on the unloading station 26 by lowering the holding unit 20 while horizontally holding on the putting faces 22c in case where the machined workpiece 61 was disengaged from the supporting unit 20 of the unloader 17. However, the machined workpiece 61 may be disengaged with the supporting unit 20 in such a manner that the machined workpiece 61 is slided on the putting faces 22c inclining the putting faces 22c of the holding unit 20 by changing into such an arrangement that the supporting unit 20 of the unloader 17 can be inclined.

In the above-mentioned laser machining cell 1, the number of the laser processing machine 43 is only one. However, the number thereof may be more than one, the same as a laser machining cell 1', as shown in FIG. 18 or FIG. 19.

Figure 18:
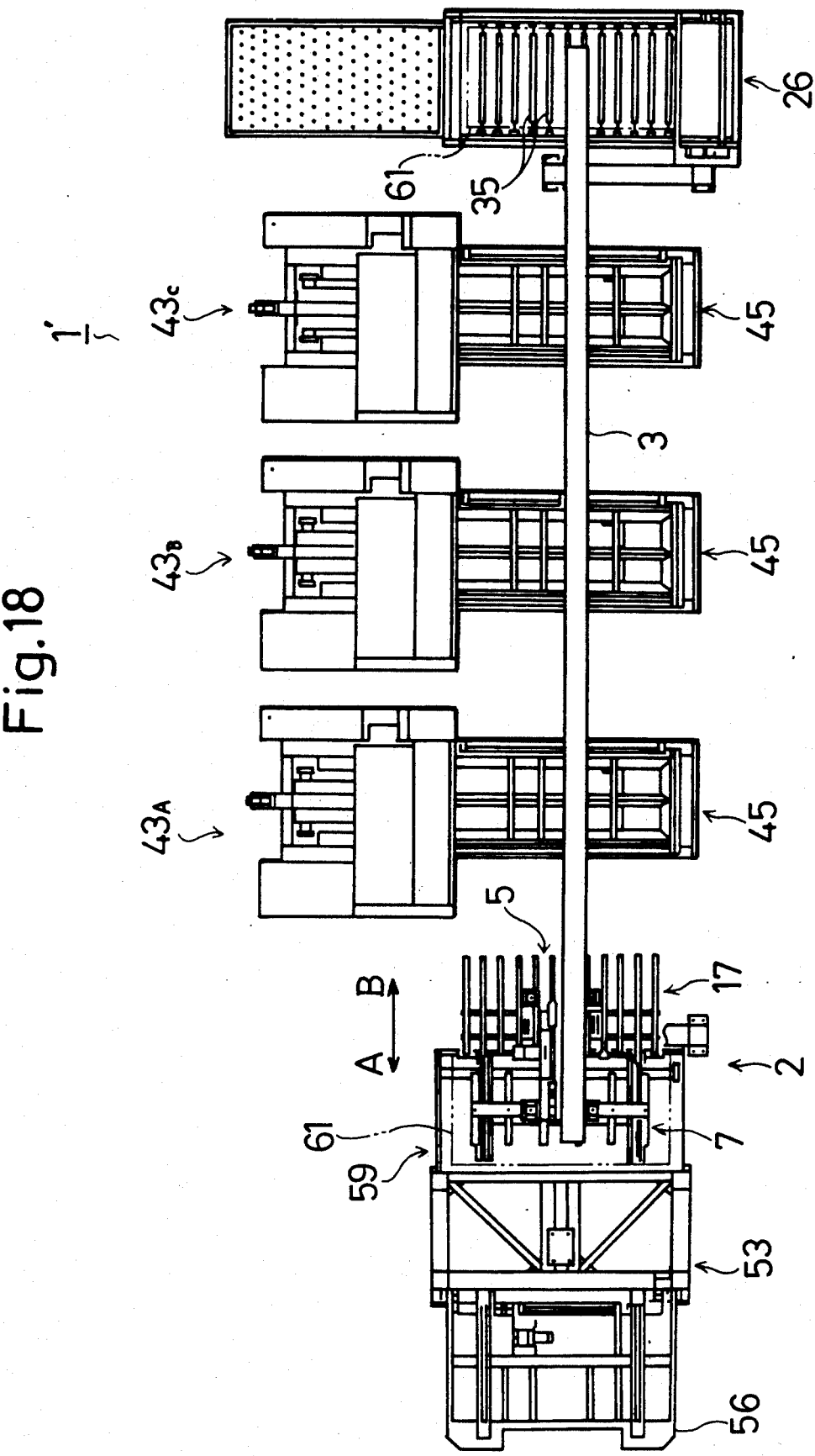
FIG. 18 is a top view showing an another embodiment of the laser machining cell according to the present invention.
Figure 19:
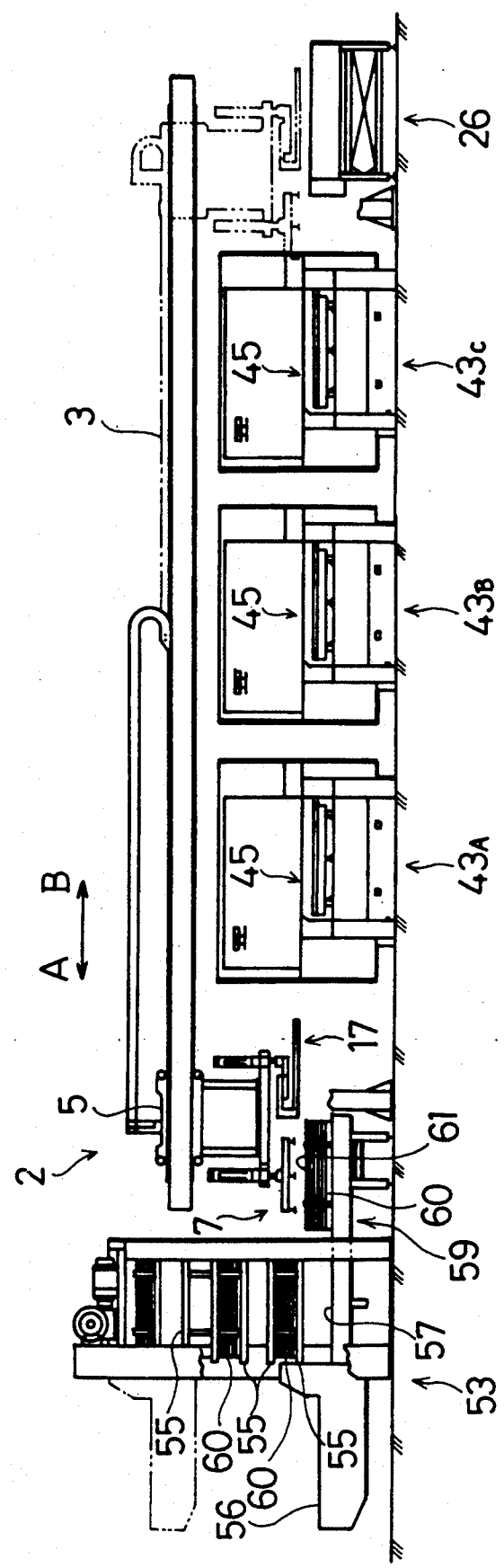
FIG. 19 a front elevation of the laser machining cell as shown in FIG. 18.

The laser machining cell 1, has three laser processing machines $43_A$, $43_B$ and $43_C$, as shown in FIG. 18 or FIG. 19. The laser processing machines $43_A$, $43_B$ and $43_C$ are disposed in the right and left directions of the figure (in the directions of the arrows A and B) in a line. Details of each laser processing machine 43 have been described in the explanation of the laser machining cell 1.

On the left hand of the laser processing machine $43_A$ in the figure, the material stocker 53 and the loading station 59 are provided. On the right hand of the laser processing machine $43_C$ of the figure, the unloading station 26 is provided. Details of the material stocker 53, the loading station 59 and the unloading station 26 have been described in the explanation of the laser machining cell 1.

On the upper hand of the loading station 59, each table 45 of the laser processing machines $43_A$, $43_B$, $43_C$ and the unloading station 26 of FIG. 19, the rail 3 of the workpiece carrying unit 2 is provided extending in the right and left directions of the figure (in the directions of the arrows A and B). Details of the workpiece carrying unit 2 have been described in the explanation of the laser machining cell 1.

Figure 20:
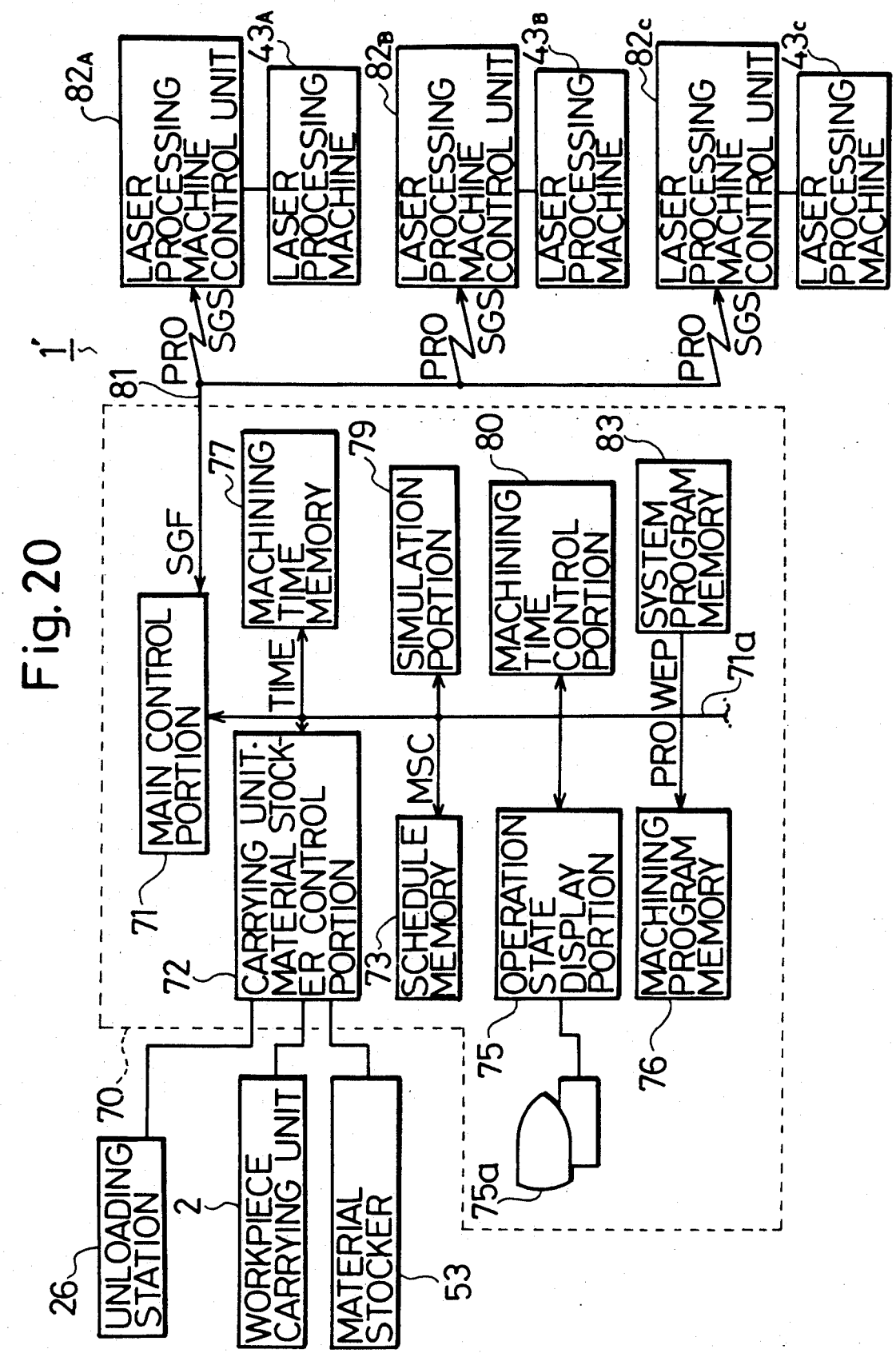
FIG. 20 is a control block diagram of the laser machining cell as shown in FIG. 18.

In the laser machining cell 1', as shown in FIG. 20, a cell control unit 70 is provided. The cell control unit 70 has a main control portion 71. A carrying unit and material stocker control portion 72, a schedule memory 73, an operation state display portion 75, a machining program memory 76, a machining time memory 77, a simulation portion 79, a machining time control portion 80, a system program memory 83 and the like are connected with the main control portion 71 through a bus line 71a. A display unit 75a, such as a CRT display, is connected with the operation state display portion 75.

The workpiece carrying unit 2, the material stocker 53 and the unloading station 26 are connected with carrying unit and material stocker control portion 72 of the cell control unit 70. Laser processing machine control units $82_A$, $82_B$, $82_C$ are connected with the main control portion 71 of the cell control unit 70 through a control line 81. The laser processing machines $43_A$, $43_B$, $43_C$ are respectively connected with the laser processing machine control units $82_A$, $82_B$, $82_C$.

The laser machining cell 1' has the above-described arrangement. In case of machining in each of the laser processing machines $43_A$, $43_B$, $43_C$, the main control portion 71 of the cell control unit 70 reads the machining schedule MSC with respect to each of the laser processing machines $43_A$, $43_B$, $43_C$ out of the schedule memory 73. In the machining schedule MSC, as shown in FIG. 22, kinds MK of the workpieces 61 to be machined and program numbers PNO of machining programs PRO to be used of the laser processing machines $43_A$, $43_B$, $43_C$ are indicated in accordance with machining order.

The main control portion 71 instructs the carrying unit and material stocker control portion 72 to carry a predetermined kind MK of the raw workpiece 61 to each of the laser processing machines $43_A$, $43_B$, $43_C$ on the basis of a machining schedule MSC. Then, the carrying unit and material stocker control portion 72 drives the lifter 56 and the carrying way 57. The pallet 60 stacking the predetermined kind MK of the raw workpiece 61 thereon is moved to the loading station 59 from a predetermined shelf 55. The carrying unit and material stocker control portion 72 drives the workpiece carrying unit 2. Thereafter, the predetermined kind MK of one raw workpiece 61 is removed from the pallet 60, put on the loading station 59 and carried to a predetermined laser processing machine 43 so as to put on the table 45 of the laser processing machine 43.

The main control portion 71 reads the machining program PRO of a predetermined program number PNO out of the machining program memory 76 on the basis of the machining schedule MSC. The main control portion 71 transfers the read machining program PRO to each of the laser processing machine controls units $82_A$, $82_B$, $82_C$ through the control line 81. Each of the laser processing machine control units $82_A$, $82_B$, $82_C$ temporarily stores the machining program PRO, transferred from the cell control unit 70, in a memory or the like.

Thereafter, the main control portion 71 of the cell control unit 70 transmits a machining start command SGS to each of the laser processing machine control units $82_A$, $82_B$, $82_C$, through the control line 81. At the same time, the machining time control portion 80 of the cell control unit 70 starts counting the machining time elapsed in each of the laser processing machines $43_A$, $43_B$, $43_C$.

With each of the laser processing machine control units $82_A$, $82_B$, $82_C$, which has received the machining start command SGS from the cell control unit 70, the workpieces 61, put on each table 45 of the laser processing machines $43_A$, $43_B$, $43_C$, are machined using the machining programs PRO, transferred from the cell control unit 70. In the laser processing machine $43_A$, the kind MK "1" of the workpiece 61 is machined using the machining program PRO of the program number PNO "1000", in the laser processing machine $43_B$, the kind MK "2" of the workpiece 61 is machined using the machining program PRO of the program number PNO "2000" and in the laser processing machine $43_C$, the kind MK "3" of the workpiece 61 is machined using the machining program PRO of the program number PNO "3000".

Figure 21:
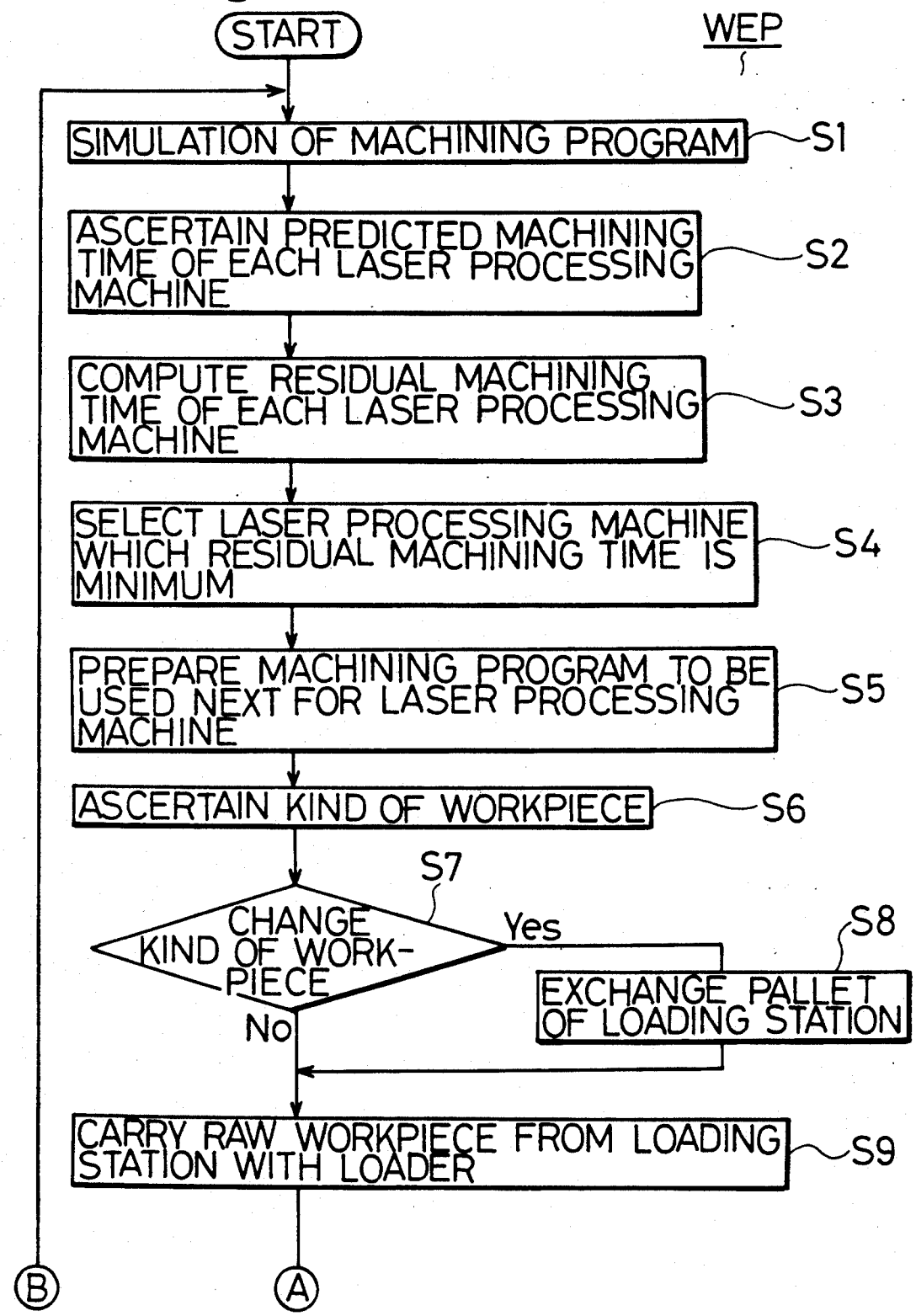
FIGS. 21a and 21b are flowcharts showing a workpiece exchange program for controlling the laser machining cell as shown in FIG. 18.
Figure 21:
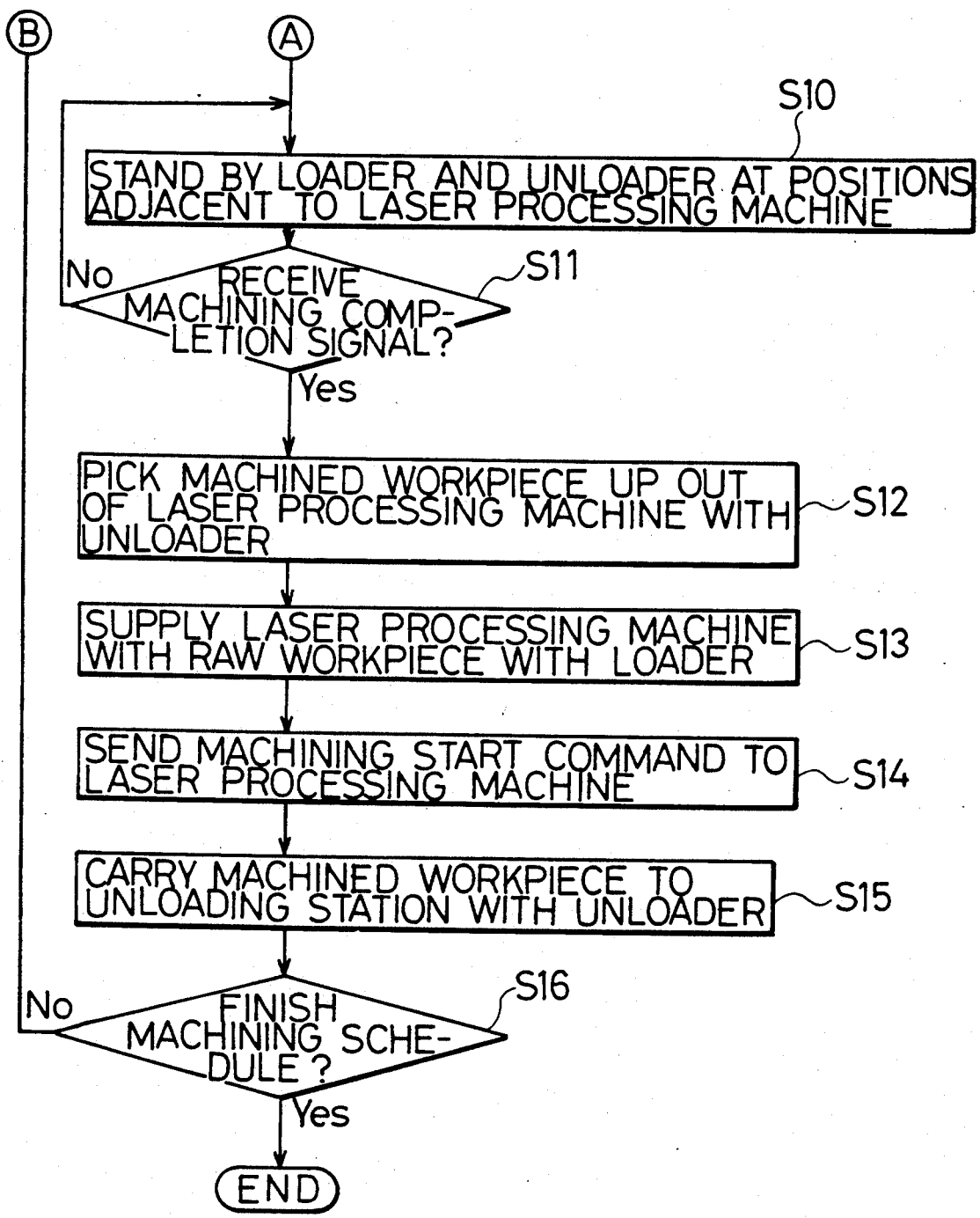

In case of machining in each of the laser processing machines $43_A$, $43_B$, $43_C$, the main control portion 71 of the cell control unit 70 reads a workpiece exchange program WEP, as shown in FIG. 21, out of the system program memory 83. The main control portion 71 then predicts the laser processing machine 43, in which machining finishes the soonest among the machinings of the laser processing machines $43_A$, $43_B$, $43_C$ on the basis of the workpiece exchange program WEP, as shown in FIG. 21 and the raw workpiece 61 to be machined next is arranged in the laser processing machine 43 predicted. When machining finishes in the laser processing machine 43 predicted, picking the machined workpiece 61 up from the laser processing machine 43 and supplying the laser processing machine 43 with the raw workpiece 61 are successively performed (that is, without any interval between picking up and the supplying) so as to minimize the workpiece exchange time.

Firstly, in Step S1 of FIG. 21, the simulation portion 79 simulates the machining program PRO of the program numbers PNO "1000", "2000", "3000" so as to compute the predicted machining time TIME "3:00", "5:00", "15:00" of each of the laser processing machines $43_A$, $43_B$, $43_C$, as shown in FIG. 23. The predicted machining time TIME is classified by the laser processing machines $43_A$, $43_B$, $43_C$ so as to store in the machining time memory 77.

In Steps S2, S3, S4 of FIG. 21, the machining time control portion 80 reads the predicted machining time TIME of the machining program PRO, which is being executed for the present in each of the laser processing machines $43_A$, $43_B$, $43_C$ out of the machining time memory 77 so as to compute the residual machining time with the difference between the predicted machining time TIME and the machining time elapsed (counted in the machining time control portion 80) for each of the laser processing machines $43_A$, $43_B$, $43_C$. The laser processing machine 43 in which the residual machining time is the shortest of the laser processing machines $43_A$, $43_B$, $43_C$, is selected as the laser processing machine 43 to be carried the raw workpiece 61.

The case where the machining of the machining order "1" of the machining schedule MSC, as shown in FIG. 22, is simultaneously started in the laser processing machines $43_A$, $43_B$, $43_C$, that is, the machining time elapsed in the laser processing machines $43_A$, $43_B$, $43_C$ is the same as one another, will now be explained hereinafter.

Since of the predicted machining time TIME computed of the machining programs PRO, as shown in the column of the machining order "1" in FIG. 23, the predicted machining time TIME "3:00" of the machining program PRO of the program number PNO "1000", which is being executed in the laser processing machine $43_A$ is the shortest, the residual machining time of the laser processing machine $43_A$ is computed so as to be the shortest. Therefore, the machining time control portion 80 predicts that the machining in the laser processing machine $43_A$, which residual machining time is the shortest of all, will finish the soonest. Then, of the three laser processing machines $43_A$, $43_B$, $43_C$, the laser processing machine $43_A$ is selected as the laser processing machine 43 to be carried the raw workpiece 61.

When the laser processing machine $43_A$ to be carried the raw workpiece 61 is selected, the main control portion 71 discriminates the program number PNO "1500" of the machining program PRO to be used for the next machining order "2" in the laser processing machine $43_A$ on the basis of the machining schedule MSC, as shown in FIG. 22, in Step S5 of FIG. 21 and reads the machining program PRO of the program number PNO "1500" out of the machining program memory 76 so as to transfer to the control unit $82_A$ of the laser processing machine $43_A$ through the control line 81.

In Steps S6, S7 of FIG. 21, the main control portion 71 discriminates the kind MK "2" of the workpiece 61 to be machined in the next machining order "2" in the laser processing machine $43_A$ on the basis of the machining schedule MSC, as shown in FIG. 22. In case where the pallet 60 putting the kind MK "2" of the raw workpiece 61 discriminated thereon doesn't exist on the loading station 59, the main control portion 71 instructs the carrying unit and material stocker control portion 72 to exchange the pallet 60 in Step S8 of FIG. 21. The carrying unit and material stocker control portion 72 then drives the carrying way 57 and the lifter 56. The pallet 60 putting the raw workpiece 61, which kind MK isn't "2", thereon, is returned to a predetermined shelf 55 from the loading station 59 and the pallet 60, putting the kind MK "2" of the raw workpiece 61 thereon, is moved to the loading station 59 from a predetermined shelf 55.

In Step S9 of FIG. 21, the carrying unit and material stocker control portion 72 drives the workpiece carrying unit 2 in which neither the loader 7 nor the unloader 17 holds something. The kind MK "2" of the raw workpiece 61 is held from the upper side thereof with the attracting unit 10 of the loader 7 so as to pick up from the pallet 60 on the loading station 59. The raw workpiece 61 is carried to the position adjacent to the left hand of the laser processing machine $43_A$ of FIG. 19.

In Steps S10, S11 of FIG. 21, the carrying unit and material stocker control portion 72 makes the loader 7, holding the raw workpiece 61, and the unloader 17, holding nothing, stood by at the position adjacent to the laser processing machine $43_A$ until the machining in the laser processing machine $43_A$ finishes.

When the machining in the laser processing machine $43_A$ finishes, the control unit $82_A$ of the laser processing machine $43_A$ transfers a machining completion signal SGF to the cell control unit 70 through the control line 81. When the machining completion signal SGF is received in Step S11 of FIG. 21, the main control portion 71 of the cell control unit 70 instructs the carrying unit and material stocker control portion 72 to exchange the workpiece. The carrying unit and material stocker control portion 72 then drives the workpiece carrying unit 2 in which the loader 7 is in the state of holding the raw workpiece 61 and the unloader 17 is in the state of holding nothing. The machined workpiece 61 is held from the lower side thereof with the supporting unit 20 of the unloader 17 so as to pick up out of the table 45 of the laser processing machine $43_A$.

In Step S13 of FIG. 21, the carrying unit and material stocker control portion 72 drives the workpiece carrying unit 2, in which the loader 7 is in a state of holding the raw workpiece 61 and the unloader 17 is in a state of holding the machined workpiece 61. Just after the machined workpiece 61 is picked up out of the table 45 of the laser processing machine $43_A$ with the unloader 17, the raw workpiece 61 is put on the table 45 of the laser processing machine $43_A$ with the loader 7.

As a result, the loader 7 and the unloader 17 of the workpiece carrying unit 2 can independently hold the workpiece 61. When machining in the laser processing machine $43_A$ finishes, the raw workpiece 61 to be machined next in the laser processing machine $43_A$ is already arranged at the position adjacent to the laser processing machine $43_A$ being held with the loader 7. Therefore, the picking up the machined workpiece 61 out of the laser processing machine $43_A$ with the unloader 17 and the supplying the laser processing machine $43_A$ with the raw workpiece 61 with the loader 7 can be performed without any interval, thereby the exchange time of the workpiece 61 in the laser processing machine $43_A$ can be made minimum.

When the exchange of the workpieces 61 in the laser processing machine $43_A$ finishes in this way, the main control portion 71 of the cell control unit 70 transfers the machining start command SGS to the laser processing machine control unit $82_A$ through the control line 81 in Step S14 of FIG. 21. At the same time, the machining time control portion 80 of the cell control unit 70 newly starts counting the machining time elapsed in the laser processing machine $43_A$. On this occasion, the machining time control portion 80 has continued counting the machining time elapsed of the laser processing machines $43_A$ and $43_B$.

The laser processing machine control unit $82_A$, received the machining start command SGS, starts machining on the kind MK "2" of the workpiece 61, put on the table 45 of the laser processing machine $43_A$ using the machining program PRO of the program number PNO "1500", transferred from the cell control unit 70.

In Step S15 of FIG. 21, the carrying unit and material stocker control portion 72 drives the workpiece carrying unit 2 in which the loader 7 is in a state of holding nothing and the unloader 17 is in a state of holding the machined workpiece 61. The machined workpiece 61 is then carried to the unloading station 26.

The simulation portion 79 of the cell control unit 70 simulates the machining program PRO of the program number PNO "1500" in Step S1 of FIG. 21. As shown in the column of the machining order "2" of FIG. 23, the new predicted machining time TIME "5:00" in the laser processing machine $43_A$ is computed. Thereafter, the machining time control portion 80 computes the residual machining time with the difference between the predicted machining time TIME of each machining program PRO, which is being executed for the present, and the machining time elapsed for each of the laser processing machines $43_A$, $43_B$, $43_C$, in a similar way to the abovedescribed case so as to discriminate the laser processing machine $43_B$, in which residual machining time is minimum. The main control portion 71 prepares the workpiece exchange of the laser processing machine $43_B$ judged that machining finishes the soonest of all.

Until all of the machinings, indicated in the machining schedule MSC of FIG. 22, finishes, Steps S1 through S16 of the workpiece exchange program WEP, as shown in FIG. 21, are repeated. Thereafter, the cell control unit 70 judges as to in which laser processing machine the machining finishes the soonest of the laser processing machines $43_A$, $43_B$, $43_C$. During the machining on the workpiece 61, another workpiece 61 is arranged in the laser processing machine 43, predicted that the machining will finish the soonest of all with the tandem workpiece carrying unit 2.

Therefore, the exchange time of the workpieces 61 in the laser processing machines $43_A$, $43_B$, $43_C$, that is, the idle time in each of the laser processing machines $43_A$, $43_B$, $43_C$ can be made minimum. In other words, the rate of operation of the laser processing machines $43_A$, $43_B$, $43_C$ can be improved. The workpiece exchange in a plurality of the laser processing machines $43_A$, $43_B$, $43_C$ can be efficiently performed with a single workpiece carrying unit 2.

In the above-described embodiment, it was mentioned that in case where the laser processing machine 43 in which machining finished the soonest of all was predicted, the predicted machining time TIME in each of the laser processing machines $43_A$, $43_B$, $43_C$ was computed in such a manner that the machining program PRO to be used for each of the laser processing machines $43_A$, $43_B$, $43_C$ was simulated through the simulation portion 79. However, in case where the predicted machining time TIME of each machining program PRO is known beforehand, there is no need to simulate the machining program PRO.

In case where the machining program PRO of a predetermined program number PNO is used a plurality of times, simulating the machining program PRO of the program number PNO once is enough. For instance, since in both of the machining orders "1" and "2" of the machining schedule MSC of FIG. 22 in the laser processing machines $43_B$, $43_C$, the machining program PRO of the same program number PNO is used, there is no need to simulate the machining programs PRO of the program numbers PNO "2000", "3000" again when the machining of the machining order "2" of the machining schedule MSC is executed in the laser processing machines 43B, 43C. On this occasion, the laser processing machine 43, in which the machining finishes the soonest of all, can be discriminated by using the predicted machining time TIME "5:00" "15:00", computed in case where the machining of the machining order "1" of the machining schedule MSC is executed.

The present invention has been explained on the basis of the embodiments presented herein. However, the embodiments which are described in the present specification are illustrative and not limiting. The scope of the invention is designated by the accompanying claims and is not restricted by the description of the specific embodiments. Accordingly, all the transformations and changes belonging to the claims are included in the scope of the present invention.

We claim:

1. A laser machining cell, comprising:
   a stock means for stocking a plurality of raw workpieces,
   one or more than one laser processing machines,
   a putting means for putting machined said workpieces thereon, and
   a carrying means for carrying said workpiece from said stock means to said laser processing machine and from said laser processing machine to said putting means.

2. The laser machining cell as set forth in claim 1, wherein:
   said carrying means is provided with a single travelling means for travelling between said stock means and said laser processing machine and between said laser processing machine and said putting means, and
   said travelling means is provided with a first holding means for holding raw said workpiece and a second holding means for holding machined said workpiece, separately.

3. The laser machining cell as set forth in claim 1, wherein:
   said carrying means is provided with a travelling means for travelling between said stock means and said laser processing machine and between said laser processing machine and said putting means,
   said travelling means is provided with a holding means for holding said workpiece, and
   said holding means is provided with a plurality of comb-like members for supporting said workpiece from the lower side thereof.

4. The laser machining cell as set forth in claim 1, wherein:
   a plurality of said laser processing machines are provided;
   said carrying means is provided with a single travelling means for travelling between said stock means and said laser processing machine and between said laser processing machine and said putting means;
   said travelling means is provided with a first holding means for holding raw said workpiece and a second holding means for holding machined said workpiece, separately;
   a machining completion discriminating means for discriminating said laser processing machine in which machining finishes the soonest of all is provided; and
   a carrying control means for controlling so as to make said carrying means stand by at a position adjacent to said laser processing machine, discriminated with said machining completion discriminating means in such a state that raw said workpiece is held with said first holding means, and so as to exchange machined said workpiece in said laser processing machine for raw said workpiece is provided.

5. The laser machining cell as set forth in claim 1, wherein:
   said putting means is provided with a main body:
   said main body is provided with a workpiece drop hole, bigger than a size of said workpiece;

said main body is provided with a supporting member for supporting said workpiece, being movable so as to open and close said workpiece drop hole; and a pallet for putting said workpieces thereon is provided on the lower hand of said workpiece drop hole of said main body.

6. The laser machining cell as set forth in claim 1, wherein:

a stock means for various kinds of workpieces, for stocking a plurality of kinds of raw workpieces is provided as said stock means: and a select means for selecting a predetermined kind of said workpiece from said stock means for various kinds of workpieces is provided.

7. The laser machining cell as set forth in claim 2, wherein said second holding means is provided with a plurality of comb-like members for supporting said workpiece from the lower side thereof.

* * * * *